United States Patent
Stearns et al.

(10) Patent No.: US 9,539,524 B2
(45) Date of Patent: *Jan. 10, 2017

(54) PUMP AND INJECTOR FOR LIQUID CHROMATOGRAPHY

(71) Applicant: Valco Instruments Company, L.P., Houston, TX (US)

(72) Inventors: Stanley D. Stearns, Houston, TX (US); Ales Plistil, Houston, TX (US)

(73) Assignee: Valco Instruments Company, L.P., Houston, TX (US)

(*) Notice: Subject to any disclaimer, the term of this patent is extended or adjusted under 35 U.S.C. 154(b) by 283 days.

This patent is subject to a terminal disclaimer.

(21) Appl. No.: 14/333,661

(22) Filed: Jul. 17, 2014

(65) Prior Publication Data

US 2014/0326650 A1 Nov. 6, 2014

Related U.S. Application Data

(63) Continuation-in-part of application No. 14/156,197, filed on Jan. 15, 2014.

(60) Provisional application No. 61/753,299, filed on Jan. 16, 2013.

(51) Int. Cl.
  *B01D 15/14* (2006.01)
  *F04B 19/00* (2006.01)
(52) U.S. Cl.
  CPC ............. *B01D 15/14* (2013.01); *F04B 19/006* (2013.01); *Y10T 137/85978* (2015.04)
(58) Field of Classification Search
  CPC ............. G01N 30/20; G01N 2030/201; G01N 2030/202; F04B 19/006; F04B 7/0007; B01D 15/14; A01B 12/006

USPC ............................................................ 239/91
  See application file for complete search history.

(56) References Cited

U.S. PATENT DOCUMENTS

| | | | |
|---|---|---|---|
| 4,300,393 A | 11/1981 | Stearns | |
| 4,444,066 A | 4/1984 | Ogle et al. | |
| 4,957,085 A | 9/1990 | Sverdlin | |
| 5,004,416 A | 4/1991 | Van Den Brink | |
| 5,948,448 A | 9/1999 | Schmidt | |
| 6,155,123 A | 12/2000 | Bakalyar | |
| 7,517,395 B2 | 4/2009 | Logan | |

(Continued)

FOREIGN PATENT DOCUMENTS

| | | |
|---|---|---|
| WO | 2012095097 A1 | 7/2012 |
| WO | 2012122442 A2 | 9/2012 |
| WO | 2012122442 A3 | 10/2013 |

OTHER PUBLICATIONS

Olona Laglera, Extended European Search Report—14740712.6, Aug. 8, 2016, 7 pages, European Patent Office, Munich, Germany.

(Continued)

*Primary Examiner* — Arthur O Hall
*Assistant Examiner* — Chee-Chong Lee
(74) *Attorney, Agent, or Firm* — Crain, Caton & James, P.C.; James E. Hudson, III

(57) ABSTRACT

A combined dual pump-injector valve utilizing a single piece of material to house the barrel for each of the two piston-based pumps and to provide the stator of the associated valve, thus eliminating any need for connections between the pumps and the valve, and therefore eliminating the potential for high-pressure leaks or pressure reductions. The combined dual pump-injector valve permits injection of nanoliter-sized samples into a chromatographic column such that complete analyses can be completed with microliters of mobile phase with nanoliters of a sample.

23 Claims, 18 Drawing Sheets

(56) References Cited

U.S. PATENT DOCUMENTS

| | | |
|---|---|---|
| 2011/0129561 A1 | 6/2011 | Adas |
| 2011/0244070 A1 | 10/2011 | Schmidt |
| 2011/0270167 A1 | 11/2011 | Matusch |
| 2013/0323103 A1 | 12/2013 | Shreve |
| 2013/0340609 A1 | 12/2013 | Shreve |
| 2014/0197247 A1 | 7/2014 | Stearns et al. |

OTHER PUBLICATIONS

William Krynski, Notification of the Transmittal of International Preliminary Report on Patentability—PCT/US2014/011697, Jan. 9, 2015, 1 page, United States Patent & Trademark Office as International Search Authority, Alexandria, Virginia 22313 USA.

William Krynski, International Preliminary Report on Patentability—PCT/US2014/011697, Jan. 6, 2015, 10 page, United States Patent & Trademark Office as International Search Authority, Alexandria, Virginia 222313 USA.

Blaine R. Copenheaver, Notification of Transmittal of the International Search Report and the Written Opinion of the International Searching Authority, or the Declaration—PCT/US2014/011697, Aug. 13, 2014, 1 page, United States Patent & Trademark Office as International Search Authority, Alexandria, Virginia 22313 USA.

Blaine R. Copenheaver, International Search Report—PCT/US2014/011697 and search History, Aug. 13, 2014, 4 pages, United States Patent & Trademark Office as International Search Authority, Alexandria, Virginia 22313 USA.

Blaine R. Copenheaver, Written Opinion of the International Searching Authority—PCT/US2014/011697, Aug. 13, 2014, 9 pages, United States Patent & Trademark Office as International Search Authority, Alexandria, Virginia 22313 USA.

Chee-Chong Lee, Non-Final Rejection—US14156197, Apr. 27, 2016, 22 pages, United States Patent & Trademark Office, Alexandria, Virginia, USA.

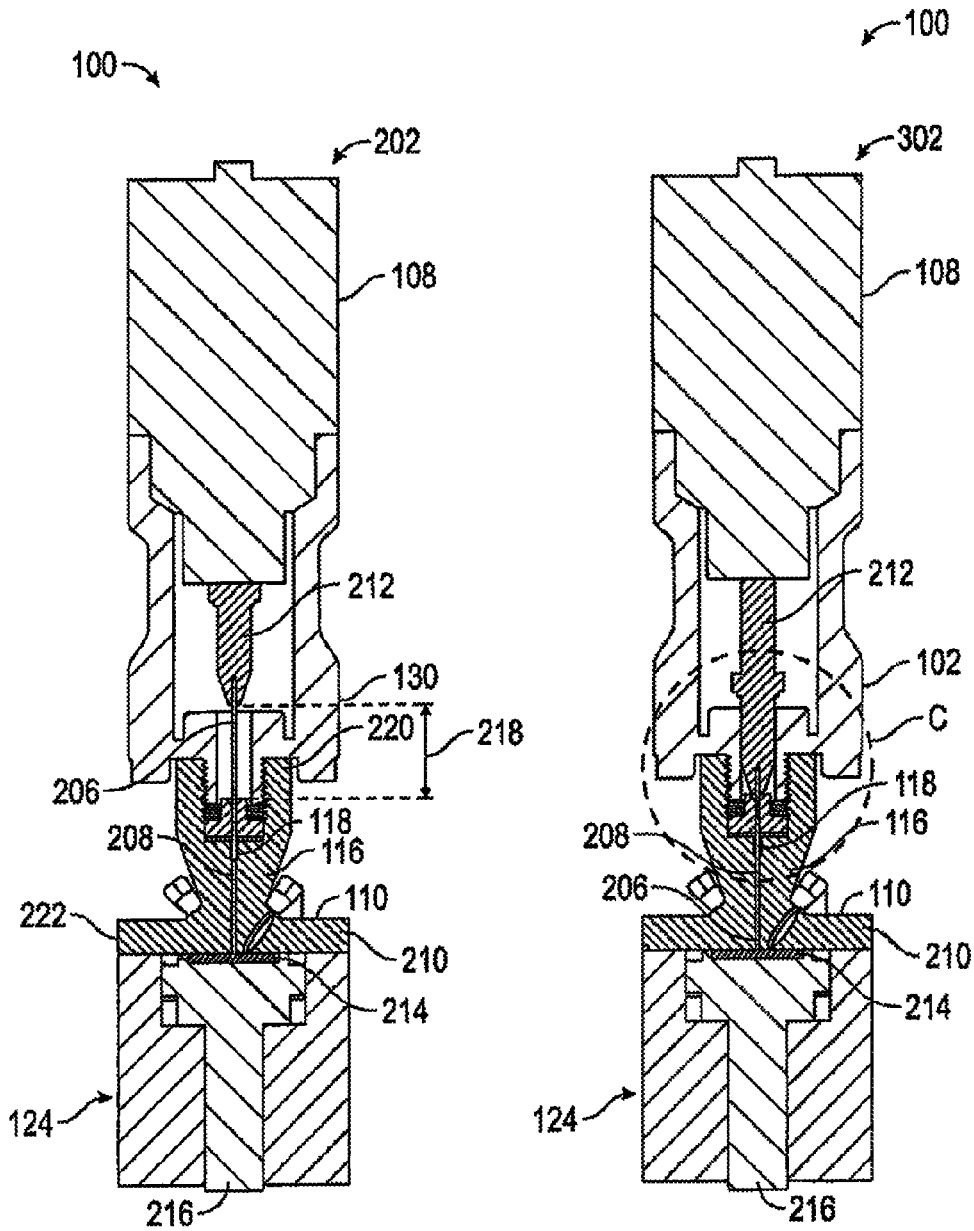

PUMP AND INJECTOR FOR LIQUID CHROMATOGRAPHY

CROSS-REFERENCE TO RELATED APPLICATIONS

This application claims the benefit of Ser. No. 14/156,197 entitled "Pump and injector for liquid chromatography" filed on Jan. 15, 2014 and of U.S. Provisional Patent Application No. 61/753,299 entitled "Integral nano-scale pump and injector for high performance liquid chromatography" filed on Jan. 16, 2013 in the United States Patent and Trademark Office and which are incorporated herein by reference.

STATEMENT REGARDING FEDERALLY SPONSORED RESEARCH OR DEVELOPMENT

Not Applicable.

BACKGROUND OF THE INVENTION

1. Field of Invention

The present invention pertains to pump and injection valve systems for use with liquid chromatography. More particularly, the present invention pertains to a combined dual pump/injection valve for injection of a nanoliter-sized sample into a chromatography column utilizing a single piece of material to house the barrel for each of the two piston-based pumps and to provide the stator of the associated valve, thus eliminating any need for connections between the pumps and valve.

2. Description of the Related Art

High performance liquid chromatography (HPLC) is generally performed using pumps, columns and injection valves scaled to deliver fluids at flow rates measured in cubic centimeters of fluid per minute. These components are typically separate and joined together to provide a system for HPLC. Unfortunately, these systems require relatively large sample volumes, large mobile phases, and large flow rates for analysis.

Additionally, these relatively large systems frustrate generate of field portable HPLC units, where there is a need for a lightweight robust flow system which uses a minimum of mobile phase during an analysis.

It would therefore be desirable to provide an integrated nano-scale pump and injection valve system for high performance liquid chromatography.

SUMMARY OF THE INVENTION

The present invention therefore meets the above needs and overcomes one or more deficiencies in the prior art by providing a combined pump/injector valve which injects nanoliter samples into a chromatographic column, which is sealed during loading of the sample and filling of the pump, such that complete analyses can be completed with microliters of mobile phase, ranging from as small as about 5-10 nanoliters, to 60 nanoliters, and larger. The present invention therefore provides a lightweight robust flow system which uses a minimum of mobile phase during an analysis and is appropriate for use as a field portable HPLC unit.

The present invention provides an integral nano-scale pump and injection valve system for high performance liquid chromatography which includes an integrated barrel-stator providing within its integral body a first elongate barrel and a second elongate barrel, and providing on the end of its integral body a stator, such that all three integrally formed of a single piece of material. As can be appreciated the integrated barrel-stator has an integrated barrel-stator first section and an integrated stator barrel second section. The stator has a stator first side, while the first elongate barrel has a first elongate barrel first open end in the integrated stator barrel first section and a second open end at the integrated barrel-stator second section, and a sidewall defining a first interior chamber to receive a supply of fluid at second open end. The first elongate barrel second open end is provided at the stator first side and provides a second stator orifice. Similarly, the second elongate barrel has a second elongate barrel first open end in the integrated stator barrel first section and a second elongate barrel second open end at the integrated barrel-stator second section, and a second elongate barrel sidewall defining an second interior chamber to receive a supply of fluid at first open end, where the second elongate barrel second open end at the stator first side provides a first stator orifice. The stator has a first stator fluid supply port for communication with a liquid supply and has a second stator fluid supply port for communication with a liquid supply, a third stator port, and a fourth stator port. The stator is in contact at a surface of a stator face with a surface of a rotor face of a rotor, and communicates with the rotor at the first stator fluid supply port and at the second stator fluid supply port. The first stator orifice and the second stator orifice are non-overlapping to ensure separateness of operation. A first longitudinal plunger is slidably disposed within the first interior chamber and is of a substantially uniform cross section. A second longitudinal plunger is slidably disposed within the second interior chamber and likewise is of a substantially uniform cross section.

In the first embodiment, the rotor has a first channel and a second channel in the rotor face and is rotable with respect to the stator about a centerpoint of the stator between a load position and an injection position. The load position is characterized by the second stator orifice in communication with the first stator fluid supply port via the first channel and the first stator orifice in communication with the second stator fluid supply port via the second channel, such that fluid may be drawn though each port from an external fluid supply. During operation in the load position, the associated pumps are filling due to retraction of the each associated plunger. The injection position characterized by the second stator orifice in communication with the third stator port via the first channel and the first stator orifice in communication with the fourth stator port via the second channel. During operation in the injection position, the associated pumps are imparting fluid due to forward movement of the each associated plunger.

As can be appreciated, the chromatographic device may be a chromatographic column.

The first embodiment may be modified, to provide a first alternative embodiment, which provides a gradient system with an external sample output to a chromatographic column without a detector. The first alternative embodiment includes, in addition to the elements of the first alternative embodiment, the stator having a fifth stator port, a sixth stator port, a seventh stator port, an eighth stator port, a ninth stator port and a tenth stator port, and a rotor having a third rotor slot in the rotor face, a fourth rotor slot in the rotor face and a fifth rotor slot in the rotor face. In the first alternative embodiment, the load position is further defined by the third stator port and the fourth stator port in communication via an external connector with the fifth stator port, the sixth stator port in communication with the seventh stator port via the third rotor slot, the seventh stator port in communication with a sample loop return, the eighth stator port in communication with a fluid sample source and in communication with the ninth stator port via the fourth rotor slot, the ninth stator port in communication with the sixth stator port via an external sample loop and the tenth stator port in communication with an input to a chromatographic device and in communication with the fifth rotor slot. In the first alternative embodiment, the injection position is further characterized by the third stator port and the fourth stator port being for communication via the external connector with the fifth stator port, the fifth stator port in communication with the sixth stator port via the third rotor slot, the sixth stator port in communication with the ninth stator port via the external sample loop, the ninth stator port in communication with the tenth stator port via the fifth rotor slot, the eighth stator port adapted for communication with the fluid sample source and in communication with the seventh stator port via the fourth rotor slot, the seventh stator port adapted for communication with a sample loop return, and the tenth stator port adapted for communication with the input to the chromatographic device.

As can be appreciated, the embodiment need not include the external connectors, columns and detectors, but must be adapted for use with them.

The first alternative embodiment may be modified to provide a second alternative embodiment, which provides a gradient system with an external sample with a detector by providing output to a chromatographic column, and provides the output from the chromatographic column to a chromatographic detector. In this second alternative embodiment, the stator further has an eleventh stator port, a twelfth stator port, and a thirteen stator port, while the rotor further has a sixth rotor slot. In the second alternative embodiment, the load position further comprises the eleventh stator port in communication with an input of a chromatographic detector, and the twelfth stator port set to receive the output of the chromatographic column. This is enabled by the twelfth stator port being in communication with the thirteenth stator port via the sixth rotor slot. The injection position thus further comprises the twelfth stator port being adapted to receive the output of the chromatographic column, the twelfth stator port in communication with the eleventh stator port via the sixth rotor slot, and the eleventh stator port being adapted to communicate to an input of a chromatographic detector.

In a third alternative embodiment, the first embodiment may be modified to provide a gradient system with an internal sample without a detector by providing a stator which further includes a fifth stator port, a sixth stator port, a seventh stator port, and an eighth stator port, and by providing a stator which further includes a third rotor slot in the rotor face of the rotor. In this fourth alternative embodiment, the load position further includes the third stator port and the fourth stator port being in communication via an external connector with the sixth stator port, the fifth stator port being in communication with an input to a chromatographic device, and the eighth stator port being in communication with a fluid sample source, and in communication with the seventh stator port via the third rotor slot. The injection position therefore further comprises the third stator port and the fourth stator port in communication via an external connector with the sixth stator port, the sixth stator port in communication with the fifth stator port via the third rotor slot, and the fifth stator port adapted for communication with an input to a chromatographic device. The third rotor slot thus contains the entire sample for processing.

The third alternative embodiment may be modified, to provide a fourth alternative embodiment, which provides a gradient system with an internal sample with output to a chromatographic column, as the chromatographic device, and provides the output from the chromatographic column to a chromatographic detector. a gradient system with an internal sample with. In this fourth alternative embodiment, the stator further has a ninth stator port and a tenth stator port, and the rotor further has a fourth rotor slot in the rotor face. In this fourth alternative embodiment, the load position further includes the tenth stator port connected to receive an output of the chromatographic column, the ninth stator port in communication with an input of a chromatographic detector. The injection position therefore further includes the tenth stator port set to receive an output of the chromatographic column, the tenth stator port communicating with the ninth stator port via the fourth rotor slot, and the ninth stator port in communication with an input of a chromatographic detector.

A fifth alternative embodiment is also provided which permits continuous flow. Like the other embodiments, the integral nano-scale pump and injection valve system for high performance liquid chromatography includes an integrated barrel-stator, said integrated barrel-stator having a first elongate barrel, a second elongate barrel, and a stator integrally formed of a single piece of material. The integrated barrel-stator has an integrated barrel-stator first section and an integrated stator barrel second section, and a stator first side in the integrally formed stator. The first elongate barrel has a first elongate barrel first open end in the integrated stator barrel first section and a second open end at the integrated barrel-stator second section, and a sidewall defining a first interior chamber adapted to receive a supply of fluid at second open end. A first elongate barrel second open end is provided at the stator first side and provides a second stator orifice. The second elongate barrel has a second elongate barrel first open end in the integrated stator barrel first section and a second elongate barrel second open end at the integrated barrel-stator second section, and a second elongate barrel sidewall defining a second interior chamber adapted to receive a supply of fluid at first open end. A second elongate barrel second open end is provided at the stator first side and provides a first stator orifice. The stator has a first stator fluid supply port and a second stator fluid supply port for communication with a liquid supply, as well as a third stator port and a fourth stator port. The stator is in contact at a surface of a stator face with a surface of a rotor face of a rotor and is adapted to communicate with the rotor at the first stator fluid supply port and the second stator fluid supply port. For effective operation, the first stator orifice and the second stator orifice are non-overlapping. A first longitudinal plunger, of substantially uniform cross section, is slidably disposed within the first interior chamber. A second longitudinal plunger, also of substantially uniform cross section, is slidably disposed within the second interior chamber. The rotor has a first channel in the rotor face and a second channel in the rotor face and is rotable with respect to the stator about a centerpoint of the stator among a first position, a second position, and a third position. In the first position, the second pump is loading, i.e. retraction of the plunger away from the rotor, while the first pump is dispensing, i.e. forward movement of the plunger in the associated barrel toward the rotor. As a result, the first position is defined by the second stator orifice communicating with the third stator port-and-slot via the first rotor slot, the third stator port-and-slot communicating with an output, the first stator orifice communicating with the second stator port via the second rotor slot, and the third stator port communicating with a supply. In the second position, both pumps are dispensing. As a result, the second position is defined by the second stator orifice communicating with the third stator port-and-slot via the first rotor slot, the third stator port-and-slot communicating with an output, the first stator orifice communicating with the fourth stator port-and-slot via the second rotor slot, and the fourth stator port-and-slot communicating with an output. In the third position, the first pump is loading while the second pump finishes dispensing. As a result, the third position is defined by the second stator orifice communicating with the third stator port-and-slot via the first rotor slot, the first stator port-and-slot adapted communicating with a supply, the first stator orifice communicating with the fourth stator port-and-slot via the second rotor slot, and the fourth stator port-and-slot communicating with an output.

Each embodiment may include a seal within the integral nano-scale pump and injection valve system utilizing a first hard plastic seal, a flexible seal, a second hard plastic seal, all to fit about the plunger, and a driving disk and a spring, provided to interact with a threaded male sleeve, i.e. a sleeve with external threads, of the system. The first hard plastic seal is sized to fit within the first elongate barrel and about, and without contacting, the first longitudinal plunger. The flexible seal is sized to fit within a first elongate barrel and to fit about the first longitudinal plunger, and to contact the longitudinal plunger, adjacent the first hard plastic seal.

The second hard plastic seal is sized to fit within the first elongate barrel and about, and without contacting, the first longitudinal plunger, and adjacent the flexible seal. The driving disk includes a bore therethrough sized to fit about the first longitudinal plunger without interference, a first end and a second end, and is sized to freely fit within the integrated barrel-stator adjacent first elongate barrel. The driving disk further includes a shoulder near the first end, and a neck at the second end, the neck sized to fit within the first elongate barrel and to contact the first hard plastic seal. The threaded male sleeve, i.e. the sleeve with external threads, has a bore therethrough sized to permit movement of the first longitudinal plunger without interference, and is sized to a threaded female section, i.e. a sleeve with internal threads, within the integrated barrel-stator adjacent the first elongate barrel. The spring contacts the shoulder of the driving disk and an end of the threaded male sleeve, i.e. the sleeve with external threads, to drive the components towards the seal.

Each embodiment may further include a first pump actuator associated with a plunger-driving piston attached to the first longitudinal plunger, as well as a second pump actuator associated with a plunger-driving piston attached to said second longitudinal plunger. Moreover, each embodiment may include a valve actuator associated with a driveshaft attached to the rotor.

Additional aspects, advantages, and embodiments of the invention will become apparent to those skilled in the art from the following description of the various embodiments and related drawings.

BRIEF DESCRIPTION OF THE DRAWINGS

So that the manner in which the described features, advantages, and objects of the invention, as well as others which will become apparent are attained and can be understood in detail; more particular description of the invention briefly summarized above may be had by referring to the embodiments thereof that are illustrated in the drawings, which drawings form a part of this specification. It is to be noted, however, that the appended drawings illustrate only typical preferred embodiments of the invention and are therefore not to be considered limiting of its scope as the invention may admit to other equally effective embodiments.

In the drawings:

FIG. 2 is a cross-section illustration of the embodiment of FIG. 1 along line Z-Z, a side view, for the maximum position of one pump in the load position.

FIG. 3 is a cross-section illustration of the embodiment of FIG. 1 along line Z-Z, the side view of FIG. 2, for the maximum position of one pump in the injection position.

DESCRIPTION OF THE PREFERRED EMBODIMENT

Figure 1:
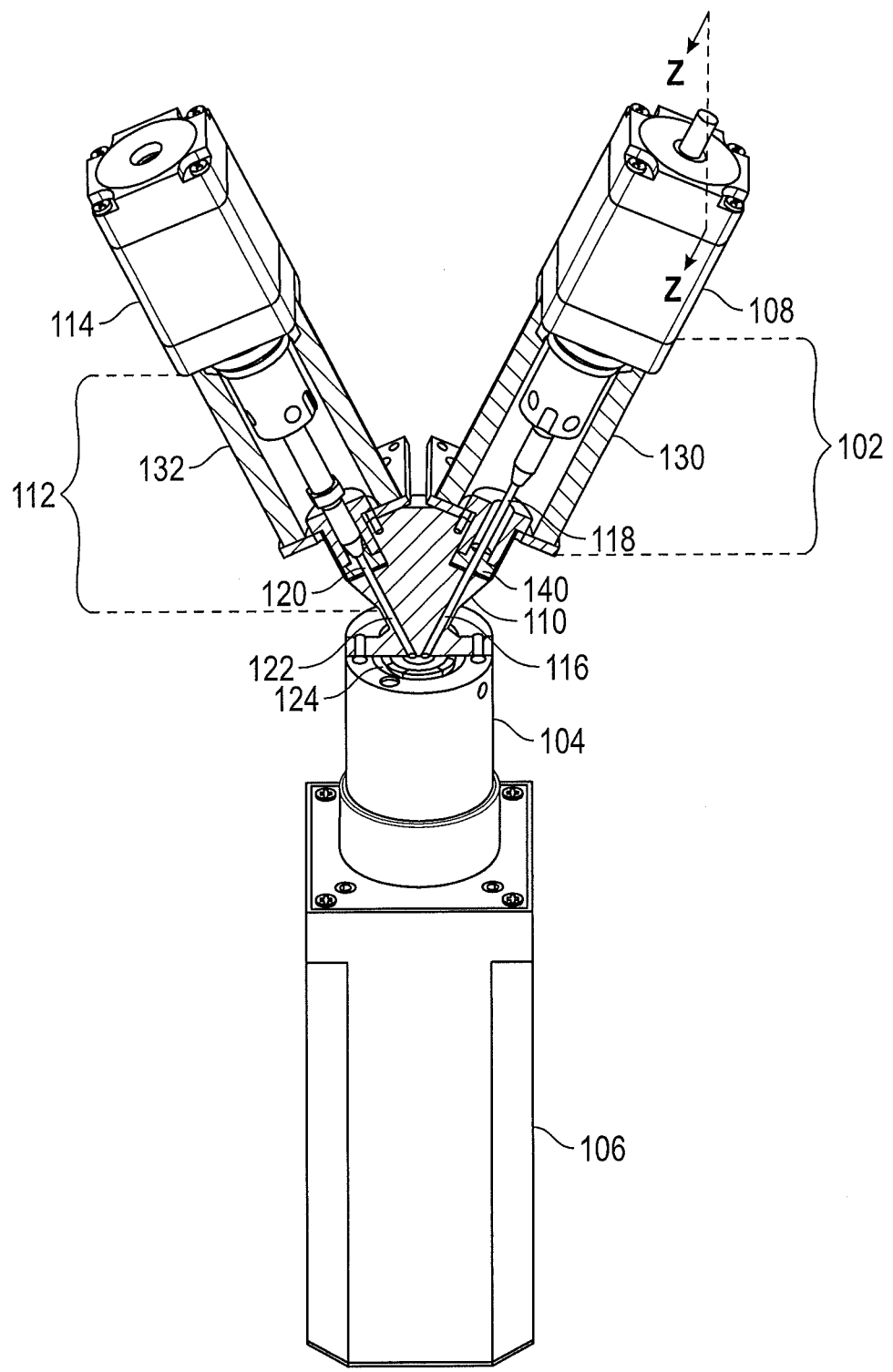
FIG. 1 is an illustration of a front view of one embodiment of the present invention as assembled and showing the internal components of the pumps.

Referring to FIG. 1, an embodiment of the integrated nano-scale pump and injection valve system 100 is provided. FIG. 1 provides an illustration of a front view of one embodiment of the present invention as assembled and showing the internal components of the pumps. As illustrated in FIG. 1, the integrated nano-scale pump and injection valve system 100 includes an integrated barrel-stator 110 which provides the interface between the first pump section 102, the second pump section 112, and valve section 104. Each pump section 102, 112 includes an actuator 108, 114, the integrated barrel-stator 110 and an external body 130, 132 to provide a structural relationship among each pump actuator 108, 114, the pump 118, 120, and the integrated barrel-stator 110. The valve section 104 includes an actuator 106.

Unlike the prior art where a valve and pump were separate bodies simply joined together, in the integrated nano-scale pump and injection valve system 100, as illustrated in FIGS. 1-4, the elongate barrel 116 of the first pump 118, the elongate barrel 122 of the second pump 120 and the stator 210 of the valve 124 are integrally formed of a single piece to provide direct communication between the first pump 118 and the valve 124 and between the second pump 120 and the valve 124 without introducing any fittings or connectors which may swell or leak during high pressure operation. Referring to FIGS. 1-4, 27, by forming the elongate barrel 116 of the first pump 118 and the second pump 120 and the stator 210 of the valve 124 of a single part as integrated barrel-stator 110, the integrated nano-scale pumps and injection valve system 100 may operate at high pressures without degradation incident to intervening parts and fittings.

Notably, the present invention provides a pump-and-injection system not only capable of pumping small volumes, and at high pressures, but also capable of providing a gradient system application, which permits substantially faster operation that conventional applications. For the first embodiment and all but the fifth alternative embodiment, the first position provides a load position where a sample flows through a groove or loop and where both the first and second pump are filling, i.e. the plunger is retracted and thus moved away from the rotor. Notably, the two pumps need not have the same carrier (mobile phase). For the second embodiment and all but the fifth alternative embodiment, the second position provides an inject position, where both pumps aspirate simultaneously, i.e. where the plunger is driven toward the rotor, one or the other, with the same, or different velocities, wherein the flow of the pumps may gradually grow or decline, depending on desirable mix volumes. The combined flow from the two pumps therefore mixes, such as in a tee, before entering a chromatographic column. After the injection cycle finishes, the system is switched again to the first, or load position. Because each pump, and the valve, has its actuator, each may be independently controlled. Additionally, as provided in the fifth alternative embodiment, the system may be uses to provide continuous flow where the two pumps have the same liquid.

A cross-section illustration of the present invention along line Z-Z of FIG. 1 for the maximum position of the first pump 118 in the load position 202, i.e. the plunger 206 is at the maximum retraction from the rotor 214, is provided in FIG. 2. A cross-section illustration of the present invention along line Z-Z of FIG. 1 for the maximum position of the first pump 118 in the injection position 302, i.e. the plunger 206 is at the maximum position when driven toward the rotor 214, is provided in FIG. 3. Operation of the second pump 120 is consistent with the operation of the first pump 118.

Referring to FIG. 2, in the load position 202, the pump plunger 206 of the first pump 118 is being retracted for filling the interior chamber 208. The plunger may have a diameter of 0.03 inches, or slightly smaller, or of 0.93 inches, or slightly larger, or may be between, such as 0.62 inches. The first pump 118 thus includes a pump plunger 206, an interior chamber 208 defined by an elongate barrel 116, and the plunger 206. The second pump 120 is identically constructed to include a pump plunger, an interior chamber defined by the elongate barrel, and a plunger. Referring to FIG. 2, the arrangement and nano-scale operation of integrated nano-scale pump and injection valve system 100 is illustrated in at the maximum position of the first pump 118 in the load position 202.

Upon initiation of loading, the first pump 118 is positioned in the load position 202 and the plunger 206 is retracted by the piston 212 and draws a solvent from a reservoir, such as through a 15 cm×200 μm steel tube into the barrel 116. At the same time and independent of pump filling, a sample is introduced into the sample loop through a capillary, which is connected to the port 308 on the pump and to a sample supply, preferably using a zero-dead volume connector. This capillary may be sized to 5.08 cm×75 μm inner diameter. The second pump 120 is loaded in the same manner, potentially, but not necessarily, at the same time.

After completion of loading, the integrated nano-scale pump and injection valve system 100 may be switched for injection, changing the direction of operation of the first pump 118, and potentially, but not necessarily, the second pump 120, and changing the position of the valve 124. Referring to FIG. 3, in the injection position 302, the pump plunger 206 of the first pump 118 is being driven forward to empty the interior chamber 208. During injection, the plunger 206 of the first pump 118 is driven by the piston 212 into the barrel 116. The rate of advance, and therefore the dispensing flow rate, may be controlled by power supply and/or by computer software.

By switching between the maximum extent of the load position 202 and the maximum extent of the injection position 302, each pump 118, 120 of the integrated nano-scale pump and injection valve system 100 may be sized to hold microliters for use with nano-scale columns for quick separation. Due to the volumes involved, refilling of each pump 118, 120, of the integrated nano-scale pump and injection valve system 100 may be accomplished is less than 2 minutes. Since typical flow rates used in capillary columns (100-150 µm i.d.) range from 100 to 500 nL/min, an isocratic separation can be easily completed without the need to refill the integrated nano-scale pump and injection valve system 100. Moreover, with the use of two pumps 118, 120, separation may be continued beyond the volume of one pump by concurrent or consecutive pump operations.

The stroke 218 of each pump 118, 120, is illustrated in FIGS. 2 and 3, and defined by the difference in position of the pump plunger 206 between the maximum load position 202 and the maximum injection position 302. The stroke 218 may be 0.25 inches, or slightly smaller, or 0.75 inches, or slightly larger, or may be between, such as at 0.50 inches. As can be appreciated, the stroke 218 and the diameter of the barrel 116 determine the volume of fluid transmitted during each load and injection cycle, which, by virtue of their values, are measured in microliters. Operation of the invention and the associated low flow rates are made possible by use of the integration of the pump sections 102, 112 and the valve section 104, unlike conventional products.

Figure 4:
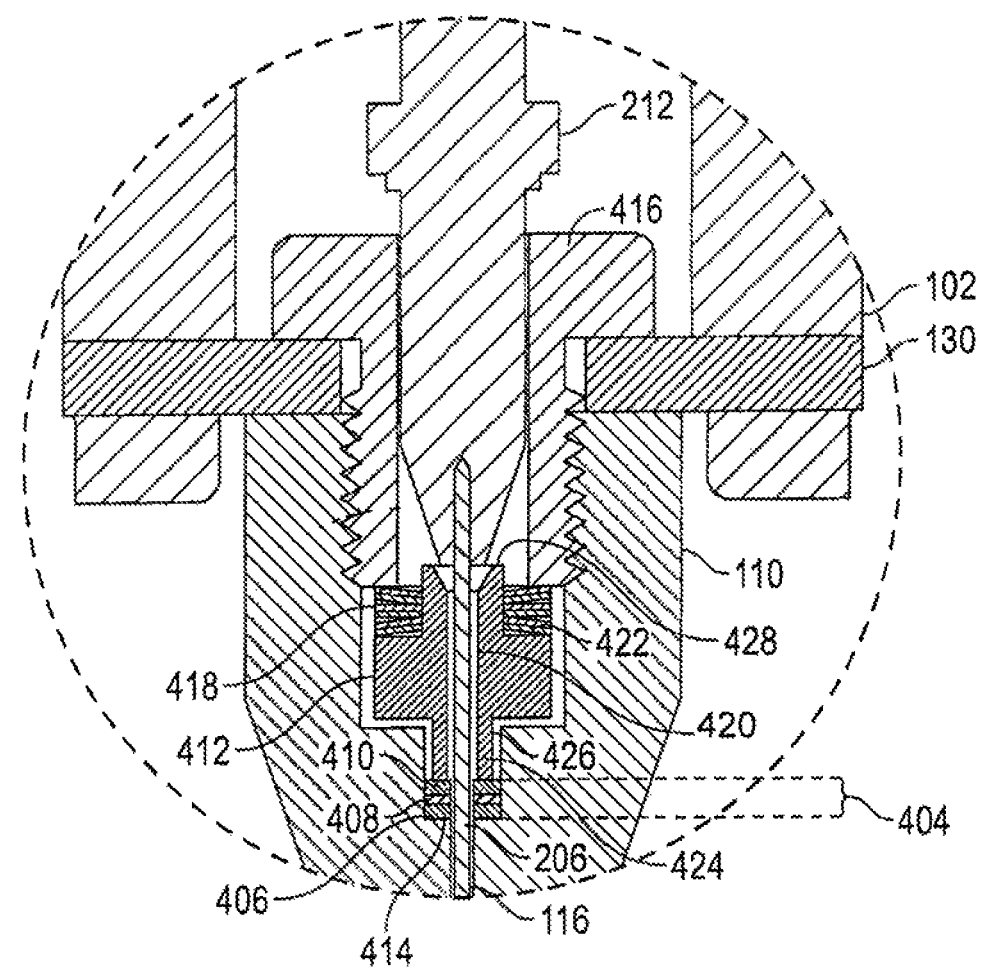
FIG. 4 is an illustration of a close-up, from FIG. 3 at section C, about the end of the plunger in the barrel illustrating the seal needed for operation at high pressure.

Referring to FIG. 4, a close-up about the end of the plunger 206 in the barrel 116 for operation at high pressure, such as above 10000 psi, it is essential that a strong seal 404 be positioned about the plunger 206 within the barrel 116 of the integrated barrel-stator 110, at least a stroke-length 218 above or beyond the first end 140 of the plunger 206 when in the maximum injection position so as to contact the plunger 206 and to form a seal thereabout. Positioning the seal 404 less than a stroke-length 218 from the first end 140 of the plunger 206 would cause the seal 404 to fail when the plunger 206 was fully retracted to reach the maximum load position. While a single seal across the barrel 116, through which the plunger 206 would move, may be used, a composite seal is preferable. As depicted in FIG. 4, the seal 404 about the plunger 206 within the barrel 116 may be formed of a compressed sequence of a first hard seal 406, which does not contact the plunger 206, a flexible seal 408, which contacts the plunger 206, and a second hard seal 410, which does not contact the plunger 206, placed under compression by a driving disk 412 maintained within the integrated barrel-stator 110. The diameter of the barrel 116 of the integrated barrel-stator 110 is enlarged for that section more than a stroke-length 218 above or beyond the first end 140 of the plunger 206 when in the maximum injection position to accept a first hard plastic seal 406. The first hard plastic seal 406 may be composed of a material such as polyether ether ketone (PEEK) or another material, and is sized to fit within the barrel 116 and about the plunger 206 without precluding movement of the plunger 206. Atop the first hard plastic seal 406 is positioned a flexible seal 408. The flexible seal 408 is composed of a compressible sealing material, such as polytetrafluoroethylene (PTFE). The flexible seal 408 is sized to fit within the barrel 116 and about the plunger 206 without precluding movement of the plunger 206. Atop the flexible seal 408 is positioned a second hard plastic seal 410, which may also may be composed of a material such as polyether ether ketone (PEEK) or another material, and is sized to fit within the barrel 116 and about the plunger 206 without precluding movement of the plunger 206. Compression of the flexible seal 408 results in lateral expansion of the flexible seal 408 and thereby causes the flexible seal 408 to provide a seal against the plunger 206 which does not preclude movement of the plunger 206, between the first hard seal 406 and the second hard seal 410. This may be accomplished by application of force against the second hard seal 410 and a shoulder 414 in the barrel 116 to maintain the position of the first hard seal 406. The application of force against the second hard seal 410 may be obtained by joining a sleeve with external threads, a threaded male sleeve or nut, 416, having a bore therethrough to freely accommodate the plunger 206 and piston 212 without interference, to the integrated barrel-stator 110, above or beyond the seal 404, which sleeve with external threads 416 would apply force to one or more springs 418, particularly a Belleville spring also known as a coned disc spring, positioned within the integrated barrel-stator 110 above or adjacent the barrel 116, to force a driving disk 412 to compress the second hard seal 412. The sleeve with external threads 416 is sized to a sleeve with internal threads, i.e. a threaded female section, 432 of the integrated barrel-stator 110 above or adjacent the barrel 116. The driving disk 412 includes a bore 420 sized to permit the plunger 206 to pass therethrough without interference, a shoulder 422 to permit the application of force against the driving disk 412 from the springs 418 smaller in diameter than the sleeve with external threads 416 so as not to contact the inner walls of the integrated barrel-stator 110, and a neck 424 at its end 426 proximate the barrel 116 sized to enter the barrel 116 without interference and having sufficient height to contact and apply force against the second hard seal 410. As a result, the neck 424 is driven against the second hard seal 410, which is in turn driven into the flexible seal 408 to compress it and form a seal about the plunger 206. The plunger 206 is therefore able to move through the flexible seal 408 without fluid seeping past, even as the flexible seal 408 may become pliable during repeated movement of the plunger 206. Because only the flexible seal 408 laterally contacts the plunger 206, and because the balance of the components, including the integrated barrel-stator 110, the sleeve with external threads 416, and the driving disk 412, include sufficient clearance for the plunger 206 to move without interference, the plunger 206 can move within the barrel 116 and can operate to draw or eject fluid into the barrel 116 and through the stator 210, particularly at high pressure.

Thus, the seal 404 includes a first hard plastic seal 406, a flexible seal 408, and a second hard plastic seal 410 and is compressed to cause the flexible seal 408 to seal about the plunger 206 by a driving disk 412, a sleeve with external threads 416, and one or more springs 418. The first hard plastic seal 406 is sized to fit within the barrel 116 and to fit about the plunger 206, without contacting the plunger 206. The flexible seal 408 is sized to fit within the barrel 116 and to fit about the plunger 206 adjacent the first hard plastic seal 406. The second hard plastic seal 410 is sized to fit within the barrel 116 and to fit about the plunger 206, without contacting the plunger 206, and adjacent the flexible seal 408. The driving disk 412 has a bore 420 therethrough sized to fit about the plunger 206 without interference, a first end 428 and a second end 426. The driving disk 412 is sized to freely fit within said integrated barrel-stator 110 adjacent the barrel 116, and includes a shoulder 422 near the first end 428, and a neck 424 at the second end 426, which neck 424 is sized to fit within the barrel 116 and to contact the first hard plastic seal 406. The sleeve with external threads 416 has a bore therethrough sized to permit movement of the plunger 206 without interference and is sized to a threaded female section within the integrated barrel-stator 110 above, or adjacent, the barrel 116. The spring 418 contacts the shoulder 422 of the driving disk 412 and an end of the sleeve with external threads 416 and is compressed as the sleeve with external threads 416 is driven into the integrated barrel-stator 110.

Referring to FIGS. 1, 2, 3, and 4, operation of each pump 118, 112 of the integrated nano-scale pump and injection valve system 100 is provided by the linear pump actuator 108, and the integrated barrel-stator 110. The linear pump actuator 108 includes a plunger-driving piston 212 connected to the plunger 206. A plunger 206, at least equal in length to the stroke 218 and nearly-equivalent to the diameter of the interior chamber 208, is attached to the end of the plunger-driving piston 212. In the load position 202, the plunger 206 is at its maximum retraction within the elongate barrel 116 and defines the maximum volume which may be moved during the stroke 218. In the injection position 302, the plunger 206 is at its maximum displacement into the elongate barrel 116. The volume displaced during the stroke 218 between the maximum position associated with the loading 202 and the maximum position associated with the injection 302 is equal to the volume of the plunger 206 introduced into the elongate barrel 116. The position of the plunger 206 in the barrel 116 and its extent during the stroke be determined with mechanical systems such as optical encoders, or others known in the art, and the maximum extent may be defined and operation limited by mechanical stops or limit switches.

Thus, the integral nano-scale pump and injection valve system 100 includes a body having a first pump section 102, a second pump section 112, and a valve section 104 where the body has a first pump 118 in the first pump section 102, a second pump 120 in the second pump section 112 and a valve 124 in the valve section 104. Each pump 118, 120 functions linearly by using an elongate barrel 116 and a plunger 206. As the barrel provides an internal chamber in which the plunger 206 moves, drawing or ejecting fluid from one end while the plunger 206 is moved from the opposing end, the elongate barrel 116 is characterized by an open proximal end, an open distal end, a length, and a sidewall, which define the interior chamber 208, interior to the integrated barrel-stator 110. As detailed, the interior chamber 208 is adapted to receive a supply of mobile phase, or other liquid, and provides operation in connection with the plunger 206 by having an inner diameter sized to the plunger, an outer diameter sized to fit within the pump section and a wall thickness therebetween to provide sufficient strength. The plunger 206, which has a substantially uniform cross-section, is slidably disposed within the interior chamber 208 and is sized to ensure effective operation during the load position 202 and the injection position 302.

Figure 27:
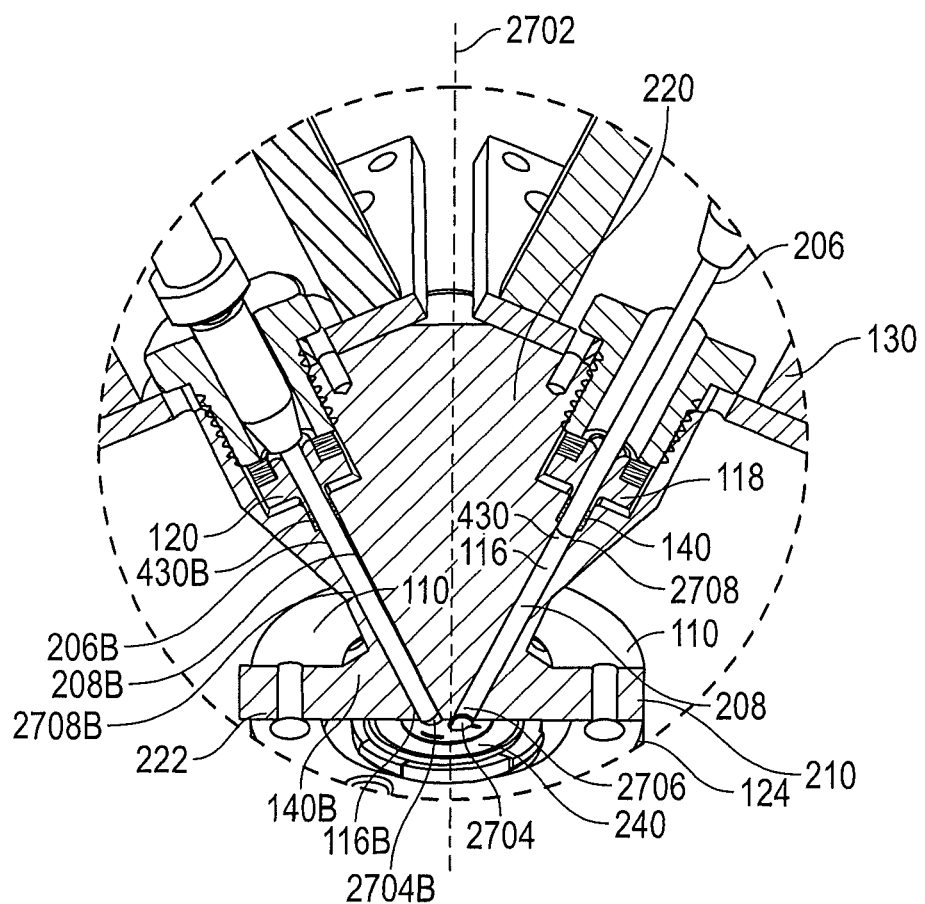
FIG. 27 is an illustration of a close-up about the ends of each of the plungers in their respective barrels in the third position of the fifth alternative embodiment.

Referring to FIG. 27, to permit operation of the first pump 118 and the second pump 120 with a common integrated barrel-stator 110, rather than providing a single pump along the centerline 2702 of the integrated barrel-stator 110, the first pump 118 and the second pump 120 are mounted equivalently near the centerline 2702 of the integrated barrel-stator 110 opposite the face, i.e. the outer surface, of the stator 210 so that the elongate pump barrel 116 of the first pump 118 and the elongate pump barrel 116B of the second pump 120 are angled toward to the centerline 2702, to intersect the centerline 2702 just beyond the face of the stator 210, thus providing a first stator orifice 2704 and a second stator orifice 2706 on the face of the stator 210. Alternatively, the first pump 118 and the second pump 120 need not be mounted equivalently near the centerline 2702 of the integrated barrel-stator 110 opposite the face of the stator 210—so long as the end of the elongate pump barrel 116 provides a first stator orifice 2704 on the face of the stator 210 and the end of the second elongate pump barrel 116B provides a second stator orifice 2706 on the face of the stator 210, such that the first stator orifice 2704 and the second stator orifice 2706 are positioned to permit operation, most likely symmetrically about the centerline 2702.

As a plunger 206 of a pump 118, 120 is driven forward by the piston 212, the content of the barrel is driven forward along a flow path provided by the valve 124, which result from the construction of the face of the stator 210 and the face, i.e. the outer surface, of the rotor 214.

Figure 28:
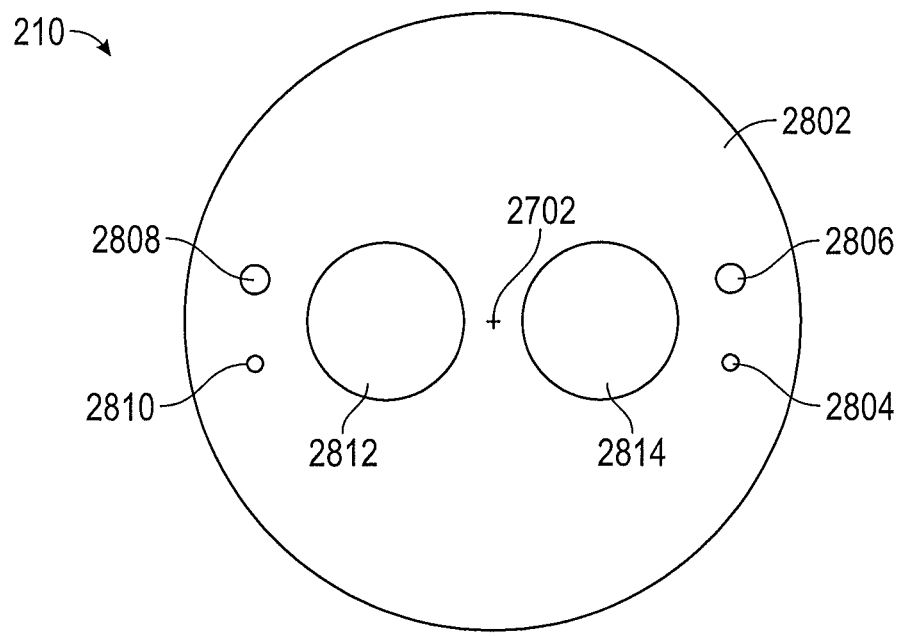
FIG. 28 is an illustration of the face of the stator of the first embodiment of the present disclosure.
Figure 29:
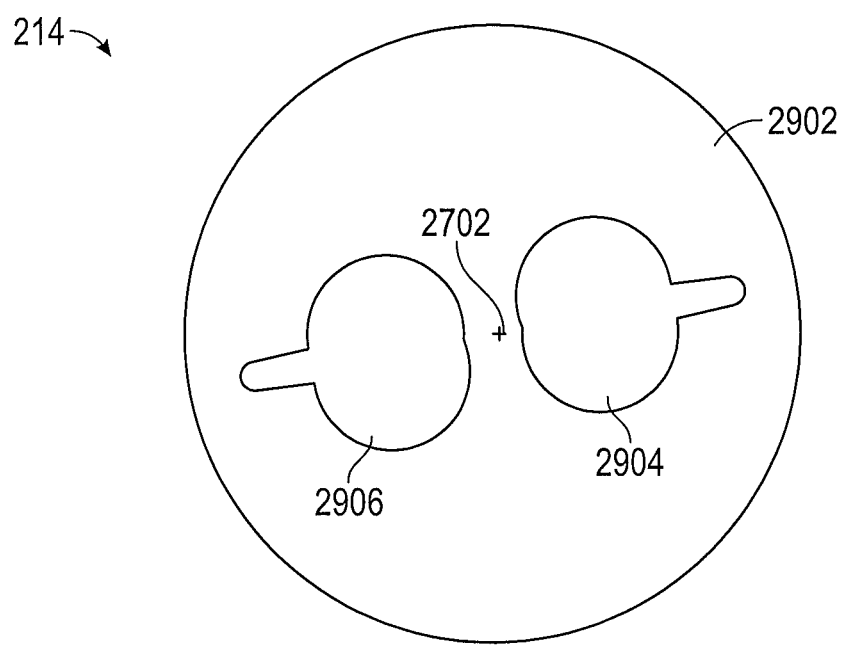
FIG. 29 is an illustration of the face of the rotor of the first embodiment of the present disclosure.

Referring to FIGS. 28, 29, 30 and 31, in a first embodiment, the integral nano-scale pump and injection valve system 100 may be used to provide a gradient system. The valve 124 has a circular stator 210, formed integrally with the elongate barrel 116 to form integrated barrel-stator 110, and a circular rotor 214 where the stator 210 and the rotor 214 cooperate to permit or preclude fluid communication among various parts of the valve 124 depending on whether the valve 124 is in the load position 202 or the injection position 302. The stator 210 for this first embodiment is illustrated in FIG. 28, while the rotor 214 is illustrated in FIG. 29.

Referring to FIG. 28, the stator 210 of the first embodiment has on its stator face 2802 a first stator orifice 2812 and a second stator orifice 2814 equally positioned about at its centerpoint 2702, together with a first stator port 2806, a second stator port 2810, a third stator port 2804, and a fourth stator port 2808. Referring to FIG. 29, the rotor 214 of the first embodiment has on its rotor face 2902 a first rotor slot 2904, and a second rotor slot 2906, forming channels, in its surface. The first rotor slot 2904 and the second rotor slot 2906 are generated with an overlapping three lobe structure such that one of two large lobes of each rotor slot each fully communicates with a first stator orifice 2812 or a second stator orifice 2814 depending on the position of the stator 210 and the rotor 214, while the third lobe provides communication to the other stator ports 2102, 2108 and ports-and-slots 2104, 2106.

The rotor 214 is rotatable with respect to the stator 210 about the centerpoint 2702 between the load position 202 and the injection position 302. In the load position 202 the mobile phase, or other liquid, is delivered to the interior chamber 208 of the first pump 118 and the second pump 120.

Figure 30:
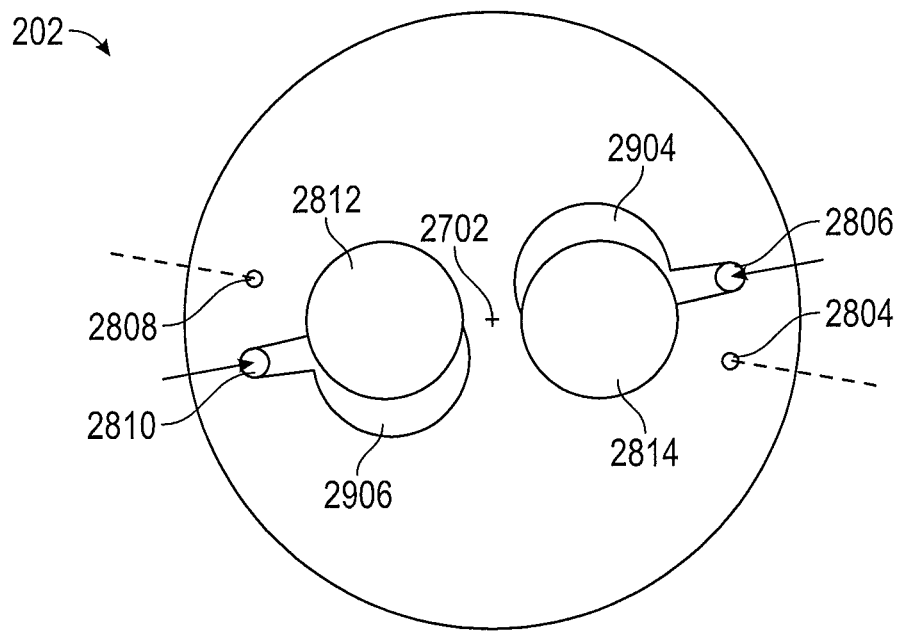
FIG. 30 is an illustration of the relative positions of the face of the stator and the face of the rotor of the first embodiment of the present disclosure in the load position.

In the load position 202 of the first embodiment, depicted in FIG. 30, the stator face 2802 includes a first stator port 2806 for communication by the first pump 118 with a first mobile phase, or other liquid, supply via a first rotor slot 2904, and a second stator port 2810 for communication by the second pump 120 with a second mobile phase, or other liquid, supply via the second rotor slot 2906. In this load position 202, both the first pump 118 and the second pump 120 are loading, and thus suctioning fluid from the second stator orifice 2814 and the first stator orifice 2812, respectively, where the first stator orifice 2812 is in communication with the second stator port 2810 via the second rotor slot 2906 and the second stator orifice 2814 is in communication with the first stator port 2806 via the first rotor slot 2904.

Figure 31:
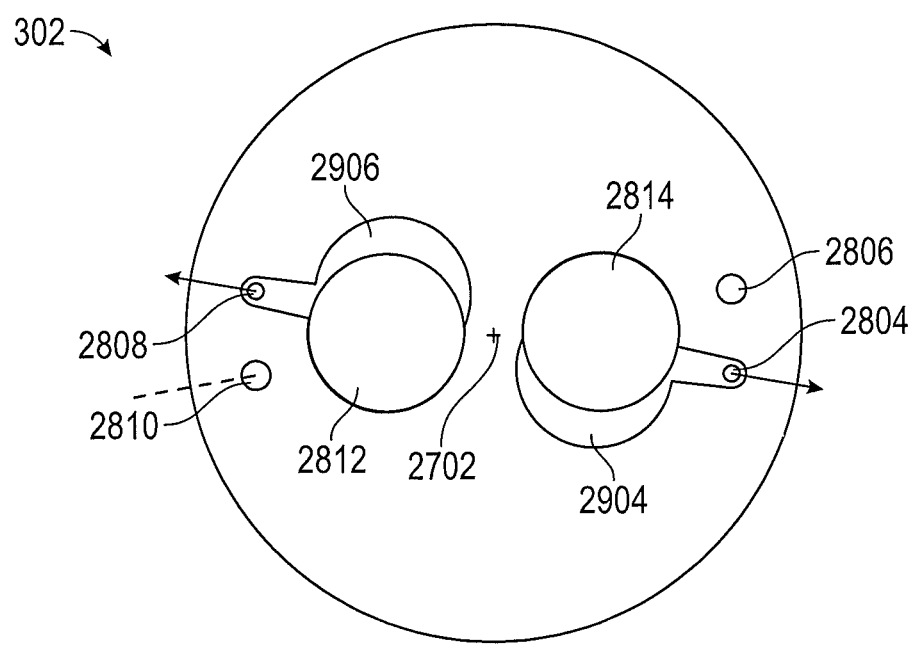
FIG. 31 is an illustration of the relative positions of the face of the stator and the face of the rotor of the first embodiment of the present disclosure in the injection position.

Referring to FIG. 31, in the injection position 302 of the first embodiment, the rotor 214 is rotated in the valve 124 by the drive shaft 216, which may be at or about 20 degrees or which may be at another selected angle, so that the existing stator ports and the existing rotor slots to create a second set of flow paths. The second stator orifice 2814 is in communication with the third stator port 2804 via the first rotor slot 2904, providing outflow, i.e. dispensing, from the first pump 118. The first stator orifice 2812 is in communication with the fourth stator port 2808 via the second rotor slot 2906, providing outflow, i.e. dispensing, from the second pump 120. The third stator port 2804 and the fourth stator port 2808 thus provide outflow, i.e. dispensing, from the first pump 118 and the second pump 120. The first stator port 2806 and the second stator port 2810, each in communication with the carrier supply, are each now isolated.

First Alternative Embodiment

Figure 5:
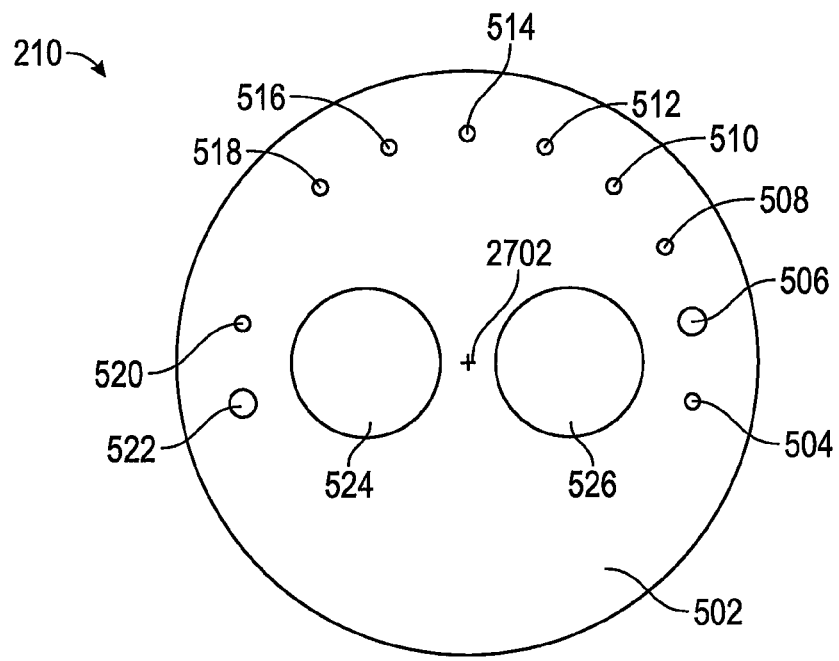
FIG. 5 is an illustration of the face of the stator of the first alternative embodiment of the present disclosure.
Figure 6:
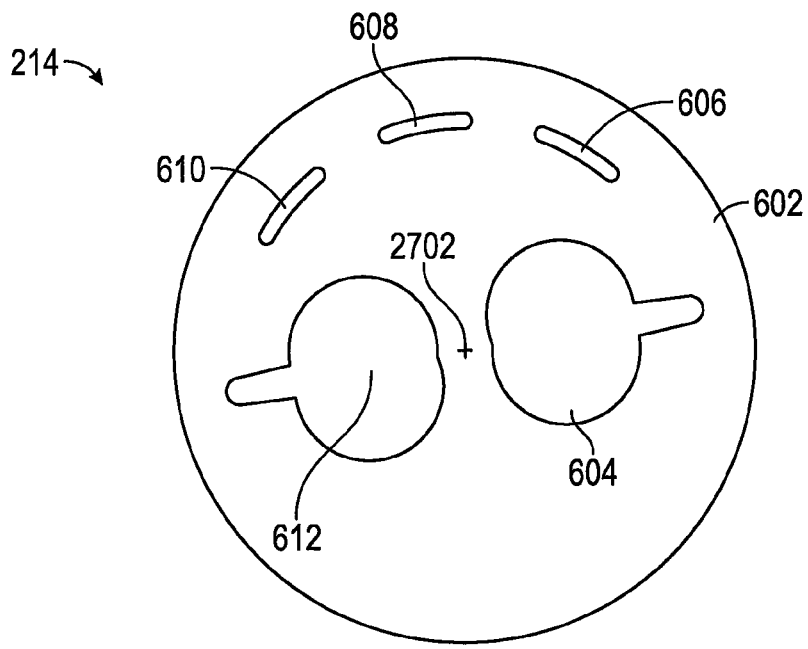
FIG. 6 is an illustration of the face of the rotor of the first alternative embodiment of the present disclosure.

Referring to FIGS. 5, 6, 7 and 8, in a first alternative embodiment, the integral nano-scale pump and injection valve system 100 may be used to provide a gradient system, using an external sample to be provided to a chromatographic column 704, but not necessarily to a chromatographic detector. The valve 124 has a circular stator 210, formed integrally with the elongate barrel 116 to form integrated barrel-stator 110, and a circular rotor 214 where the stator 210 and the rotor 214 cooperate to permit or preclude fluid communication among various parts of the valve 124 depending on whether the valve 124 is in the load position 202 or the injection position 302. The stator 210 for this first alternative embodiment is illustrated in FIG. 5, while the rotor 214 is illustrated in FIG. 6.

Referring to FIG. 5, the stator 210 of the first alternative embodiment has on its stator face 502 a second stator orifice 526 and a first stator orifice 524 equally positioned about at its centerpoint 2702, together with a first stator port 506, a second stator port 522, a third stator port 504, a fourth stator port 520, a fifth stator port 508, a sixth stator port 510, a seventh stator port 512, an eighth stator port 514, a ninth stator port 516, a tenth stator port 518. Referring to FIG. 6, the rotor 214 of the first alternative embodiment has on its rotor face 602 a first rotor slot 604, a second rotor slot 612, a third rotor slot 606, a fourth rotor slot 608, and a fifth rotor slot 610, forming channels, in its surface. While the third rotor slot 606, the fourth rotor slot 608 and the fifth rotor slot 610 are arcs of nearly elliptical shape positioned distant the centerpoint 2702, the first rotor slot 604 and the second rotor slot 612 are generated with an overlapping three lobe structure such that one of two large lobes of each rotor slot each fully communicates with a second stator orifice 526 or a first stator orifice 524 depending on the position of the stator 210 and the rotor 214, while the third lobe provides communication to the other stator orifices 504, 506, 508, 510, 512, 514, 516, 518, 520, 522, 524.

The rotor 214 is rotatable with respect to the stator 210 about the centerpoint between the load position 202 and the injection position 302. In the load position 202, components are isolated while the mobile phase, or other liquid, is delivered to the interior chamber 208 of the first pump 118 and the second pump 120.

Figure 7:
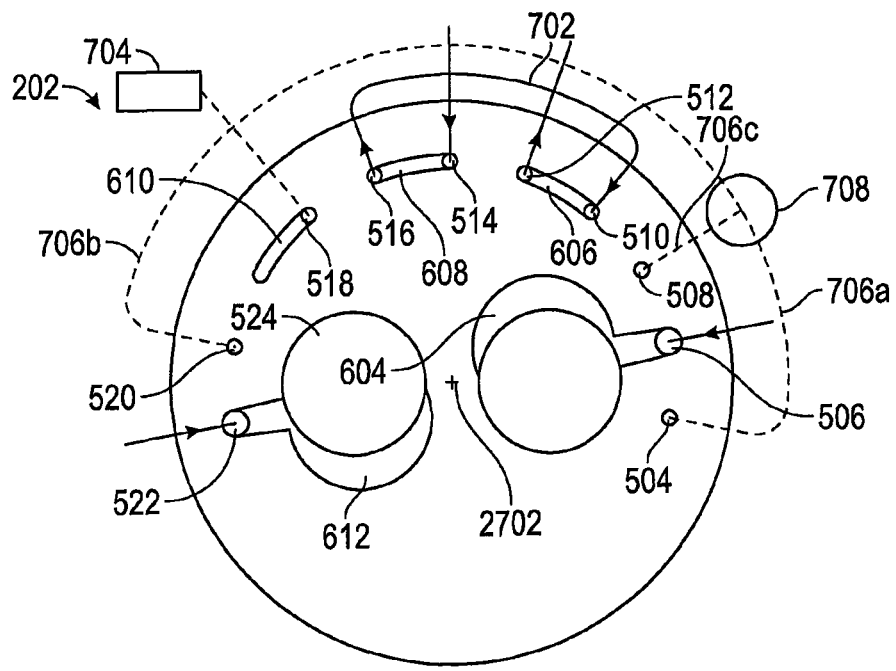
FIG. 7 is an illustration of the relative positions of the face of the stator and the face of the rotor of the first alternative embodiment of the present disclosure in the load position.
Figure 32:
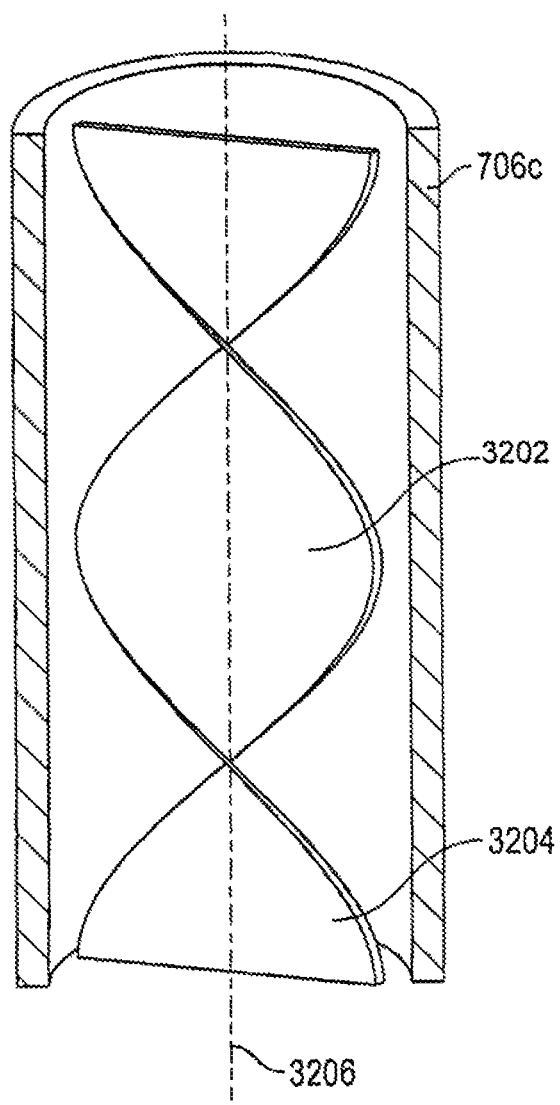
FIG. 32 is an illustration of a connector and internal assembly of the present disclosure functioning as a static mixer.

In the load position 202 of the first alternative embodiment, depicted in FIG. 7, the stator face 502 includes a third stator port 504 in communication via a first external connector 706a with a three-way connector 708, and a fourth stator port 520 in communication via a second external connector 706b with a three-way connector 708 which is in communication with the fifth stator port 508 via a third external connector 706c. This provides a line on standby. The three-way connector 708 and/or the third external connector 706c function as a static mixer to ensure the two inputs are thoroughly and completely mixed so as to provide a homogeneous solution. With respect to the three-way connector 708, static mixing of the low flow rates of the present disclosure may be accomplished by the three-way connector 708 being a mixing tee. With respect to use of the third external connector 706c as a static mixer, as illustrated in FIG. 32, an internal member 3202 is inserted within the third external connector 706c to create turbulence within the third external connector 706. The internal member 3202 may comprise a plate 3204 twisted along its longitudinal axis 3206.

The stator face 502 further includes a first stator port 506 for communication by the first pump 118 with a first mobile phase, or other liquid, supply via a first rotor slot 604, and a second stator port 522 for communication by the second pump 120 with a second mobile phase, or other liquid, supply via the second rotor slot 612. The stator face 502 includes a sixth stator port 510 in communication with the seventh stator port 512 via the third rotor slot 606, from which an outflow of a sample loop 702 exits from the seventh stator port 512, and in communication with outflow from the ninth stator port 516. The eighth stator port 514 is in communication with the external sample flow and in communication with the ninth stator port 516 via the fourth rotor slot 608. A sample loop 702 is thus created between the ninth stator port 516 and the sixth stator port 510. The tenth stator port 518 is in communication with an external chromatographic column 704 and in communication with the fifth rotor slot 610 and provides a line on standby. In this load position 202, both the first pump 118 and the second pump 120 are loading, and thus suctioning fluid from the first stator orifice 524 and the second stator orifice 526, respectively, where the first stator orifice is in communication with the second stator port 522 via the second rotor slot 612 and the second stator orifice is in communication with the first stator port 506 via the first rotor slot 604.

Figure 8:
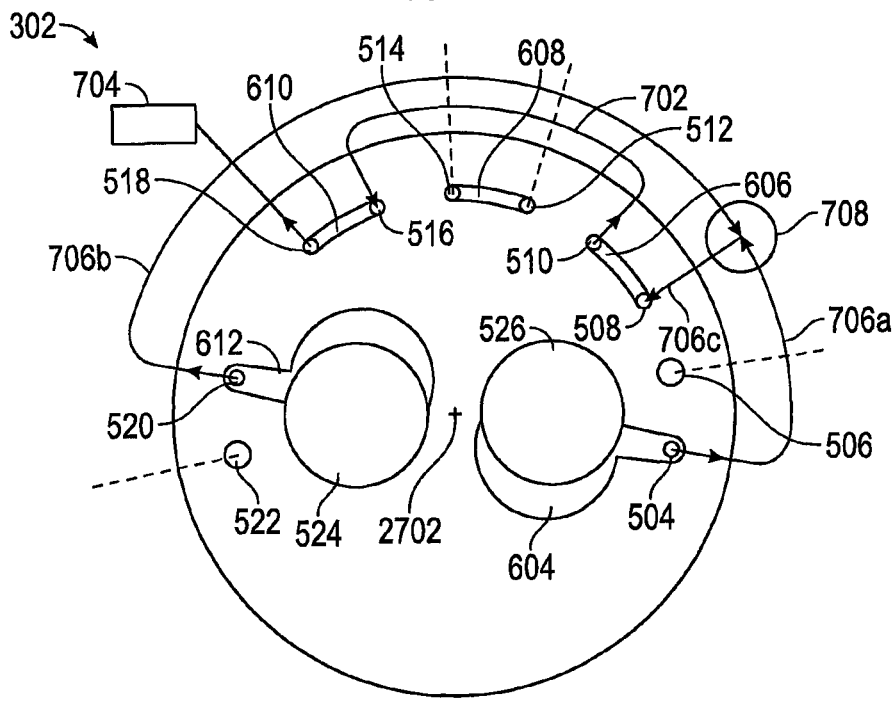
FIG. 8 is an illustration of the relative positions of the face of the stator and the face of the rotor of the first alternative embodiment of the present disclosure in the injection position.

Referring to FIG. 8, in the injection position 302 of the first alternative embodiment, the rotor 214 is rotated in the valve 124 by the drive shaft 216, which may be at or about 20 degrees, so that the existing stator ports and the existing rotor slots to create a second set of flow paths. The second stator orifice 526 is in communication with the third stator port 504 via the first rotor slot 604, providing outflow, i.e. dispensing, from the first pump 118. The first stator orifice 524 is in communication with the fourth stator port 520 via the second rotor slot 612, providing outflow, i.e. dispensing, from the second pump 120. The third stator port 504 and the fourth stator port 520 thus provide outflow, i.e. dispensing, from the first pump 118 and the second pump 120 and are operably in communication with the three-way connector 708 prior to communication with the fifth stator port 508. The first stator port 506 and the second stator port 522, each in communication with the carrier supply, are each now isolated. Because the fifth stator port 508 is also in communication with the sixth stator port 510 via the third rotor slot 606, the sample contained in the sample loop 702, including that portion of the sample contained in the third rotor slot 606 is driven through the sample loop 702 by communication with the sixth stator port 510, which is also in communication with the ninth stator port 516. The tenth stator port 518 is in communication with the fourth stator port 520 via the fifth rotor slot 610, which then provides the moving sample to a chromatographic column 704, or other device. The sample supply continues to provide flow, through the ninth stator port 516 which is in communication with the eighth stator port 514 via the fourth rotor slot 608, as the eighth stator port 514 is adapted for communication with, and during operation is in communication with, the sample supply and the ninth stator port 516 provides outflow.

The column 704 may therefore maintained at pressure and isolated while the interior chambers 208 of the first pump 118, as illustrated in FIG. 2, and the second pump 120 is filled by a mobile phase, or other liquid. For initial charging of the column 704, the operator can run the mobile phase, or other liquid, through the eighth stator port 514, through the sample loop 702, and out the seventh stator port 512, switching between the load position 202 and the injection position 302 to fill the column 704 and to ensure no bubbles are present in the system.

The external sample loop 702, which carries the mobile phase, or other liquid, to the column during injection (dispensing), may have a small inner diameter, such as 75 or 150 μm, may be of materials selected by the operator, such as stainless steel or fused silica. and may be of a length sized to each pump 118, 120, such as a length of 5.08 cm.

Second Alternative Embodiment

Referring to FIGS. 9, 10, 11 and 12, in a second alternative embodiment, the integral nano-scale pump and injection valve system 100 may be used to provide a gradient system, using an external sample to be provided to a chromatographic column 1104 and thereafter to a chromatographic detector 1106.

Figure 9:
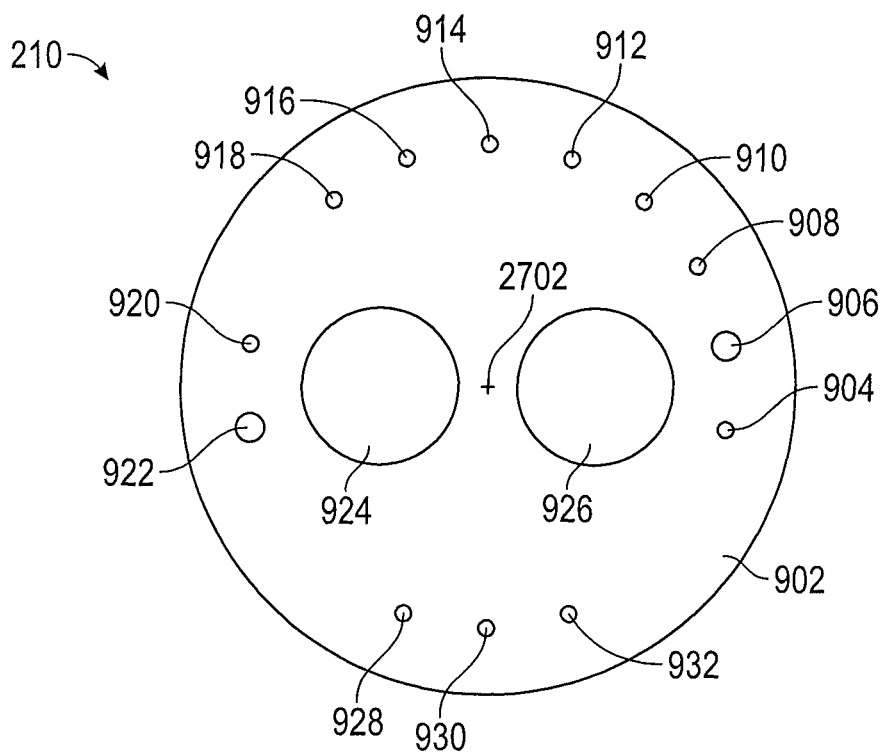
FIG. 9 is an illustration of the face of the stator of the second alternative embodiment of the present disclosure.
Figure 10:
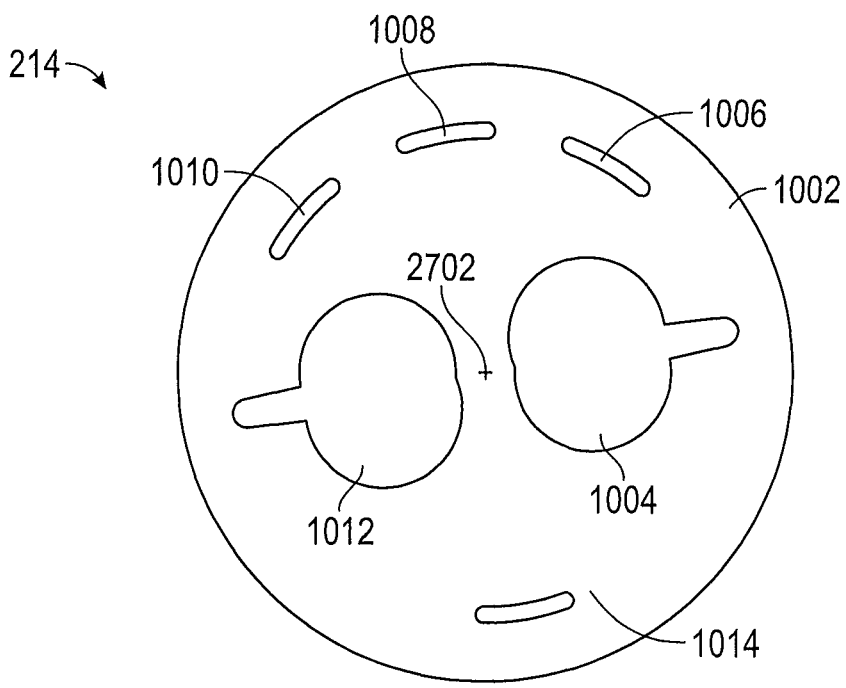
FIG. 10 is an illustration of the face of the rotor of the second alternative embodiment of the present disclosure.

The stator 210 for the second alternative embodiment is illustrated in FIG. 9, while the rotor 214 is illustrated in FIG. 10. The arrangement of the first pump 118 and the second pump 120 remains consistent with the first alternative embodiment. The second alternative embodiment departs from the first alternative embodiment by the use of an eleventh stator port 928, a twelfth stator port 930, and a thirteen stator port 932, which in connection with a sixth rotor slot 1014 permits a return from the column 1104 to be controlled and directed to a chromatographic detector 1106.

Referring to FIG. 9, the stator 210 of the second alternative embodiment has on its stator face 902, a first stator orifice 924 and a second stator orifice 926 equally positioned about at its centerpoint 2702, together with a third stator port 904, a first stator port 906, a fifth stator port 908, a sixth stator port 910, a seventh stator port 912, an eighth stator port 914, a ninth stator port 916, a tenth stator port 918, a fourth stator port 920, a second stator port 522, an eleventh stator port 528, a twelfth stator port 530, and a thirteenth stator port 532. Referring to FIG. 10, the rotor 214 of the second alternative embodiment has on its rotor face 1002 a first rotor slot 1004, a second rotor slot 1012, a third rotor slot 1006, a fourth rotor slot 1008, a fifth rotor slot 1010, and a sixth slot 1014, forming channels, in its surface. While the third rotor slot 1006, the fourth rotor slot 1008 and the fifth rotor slot 1010 are arcs of nearly elliptical shape positioned distant the centerpoint 2702, the first rotor slot 1004 and the second rotor slot 1012 are generated with an overlapping three lobe structure such that one of two large lobes of each rotor slot each fully communicates with a first stator orifice 924 or a second stator orifice 926 depending on the position of the stator 210 and the rotor 214, while the third lobe provides communication to the other stator orifices 904, 906, 908, 910, 912, 914, 916, 918, 920, 922, 924.

Figure 11:
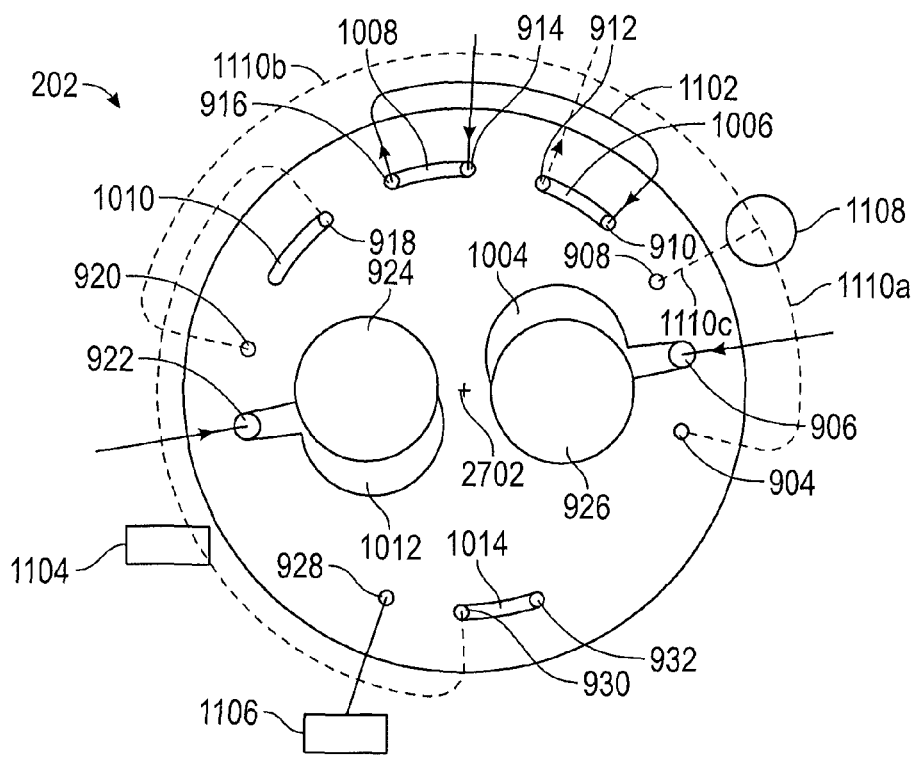
FIG. 11 is an illustration of the relative positions of the face of the stator and the face of the rotor of the second alternative embodiment of the present disclosure in the load position.

In the load position 202 of the second alternative embodiment, depicted in FIG. 11, the stator face 902 includes a third stator port 904 in communication via a first external connector 1110a with a three-way connector 1108 and a fourth stator port 920 in communication via a second external connector 1110b with a three-way connector 1108, which is in turn in communication with the fifth stator port 908 via a third external connector 1110c. This provides a line on standby. The three-way connector 1108 and/or the third external connector 1110c function as a static mixer to to ensure the two inputs are thoroughly and completely mixed so as to provide a homogeneous solution as previously described in connection with the first alternative embodiment. The stator face 902 further includes a first stator port 906 for communication by the first pump 118 with a first mobile phase, or other liquid, supply via a first rotor slot 1004, and a tenth stator port 1022 for communication by the second pump 120 with a second mobile phase, or other liquid, supply via the second rotor slot 1012. The stator face 902 includes a sixth stator port 910 in communication with the seventh stator port 912 via the third rotor slot 1006, from which an outflow of a sample loop exits from the seventh stator port 912, and in communication with outflow from the ninth stator port 916. The eighth stator port 914 is in communication with the external sample flow and in communication with the ninth stator port 916 via the fourth rotor slot 1008. A sample loop 1102 is thus created between the ninth stator port 916 and the sixth stator port 910. The tenth stator port 918 is adapted for communication with, and during operation is in communication with, the input of the external chromatographic column 1104 and in communication with fifth rotor slot 1010. The output of the external chromatographic column 1104 is in communication with the twelfth stator port 930, which is in communication with the thirteenth stator port 932 via the sixth rotor slot 1014, and which provides a line on standby. The eleventh stator port 928 is isolated, except to communication with the input to a chromatographic detector 1106. In this load position 202, both the first pump 118 and the second pump 120 are loading, and thus suctioning fluid from the second stator orifice 926 and the first stator orifice 924, respectively, where the first stator orifice is in communication with the second stator port 922 via the second rotor slot 1012 and the second stator orifice 926 is in communication with the first stator port 906 via the first rotor slot 1004.

Figure 12:
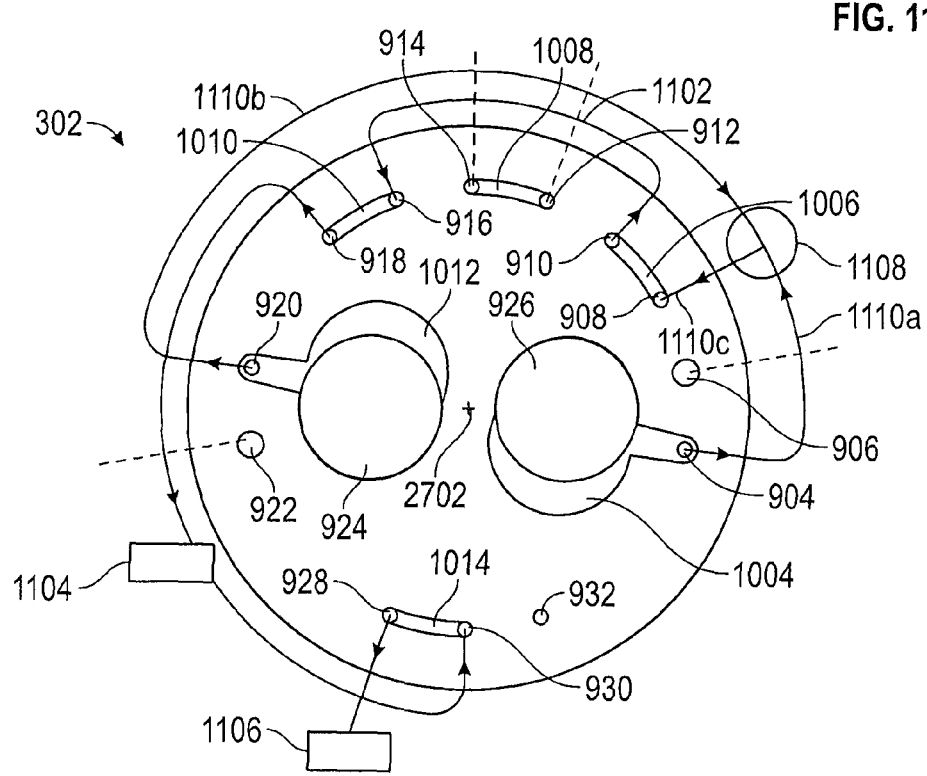
FIG. 12 is an illustration of the relative positions of the face of the stator and the face of the rotor of the second alternative embodiment of the present disclosure in the injection position.

Referring to FIG. 12, in the injection position 302 of the second alternative embodiment, the rotor 214 is rotated in the valve 124 by the drive shaft 216, which may be at or about 20 degrees, so that the existing stator ports and the existing rotor slots to create a second set of flow paths. The second stator orifice 926 is in communication with the third stator port 904 via the first rotor slot 1004, providing outflow, i.e. dispensing, from the first pump 118. The first stator orifice 924 is in communication with the fourth stator port 920 via the second rotor slot 1012, providing outflow, i.e. dispensing, from the second pump 120. The third stator port 904 and the fourth stator port 920 thus provide outflow, i.e. dispensing, from the first pump 118 and the second pump 120 and are operably in communication, with the three-way connector 1108, prior to communication with the fifth stator port 908. The first stator port 906 and the second stator port 922, each in communication with the carrier supply, are each now isolated. Because the fifth stator port 908 is also in communication with the sixth stator port 910 via the third rotor slot 1006, the sample contained in the sample loop 1102, including that portion of the sample contained in the third rotor slot 1006 is driven through the sample loop 1102 by communication with the sixth stator port 910, which is also in communication with the ninth stator port 916. The tenth stator port 918 is in communication with the fourth stator port 920 via the fifth rotor slot 1010, which then provides the moving sample to a chromatographic column 1104, whereafter the separated sample is returned to the valve 124 at the twelfth stator port 930, which communicates with eleventh stator port 928 via the sixth rotor slot 1014 to provide the separated sample to the chromatographic detector 1106. While in the injection position, the first stator port 906, the second stator port 922, and the thirteenth stator port 932 are isolated from other stator ports. The sample supply continues to provide flow, through the ninth stator port 916 which is in communication with the eighth stator port 914 via the fourth rotor slot 1008, as the eighth stator port 914 is adapted for communication with, and during operation is in communication with, the sample supply and the ninth stator port 916 provides outflow. As both ends of the column 1104 can be connected to the integrated nano-scale pump and injection valve system 100 to maintain pressure during filling of the integrated nano-scale pump and injection valve system 100 when the flow through the column 1104 is stopped, if desired. This would eliminate a delay period for column re-pressurization.

Third Alternative Embodiment

Referring to FIGS. 13, 14, 15 and 16, in a third alternative embodiment, the integral nano-scale pump and injection valve system 100 may be used to provide a gradient system, providing a sample in an internal sample groove 1502 to a chromatographic column 1504, but not thereafter to a chromatographic detector.

Figure 13:
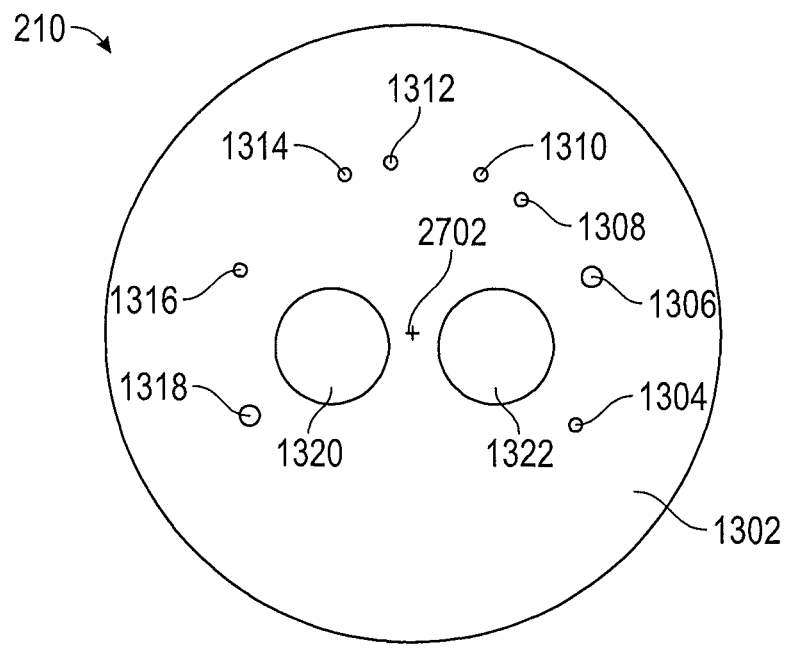
FIG. 13 is an illustration of the face of the stator of the third alternative embodiment of the present disclosure.
Figure 14:
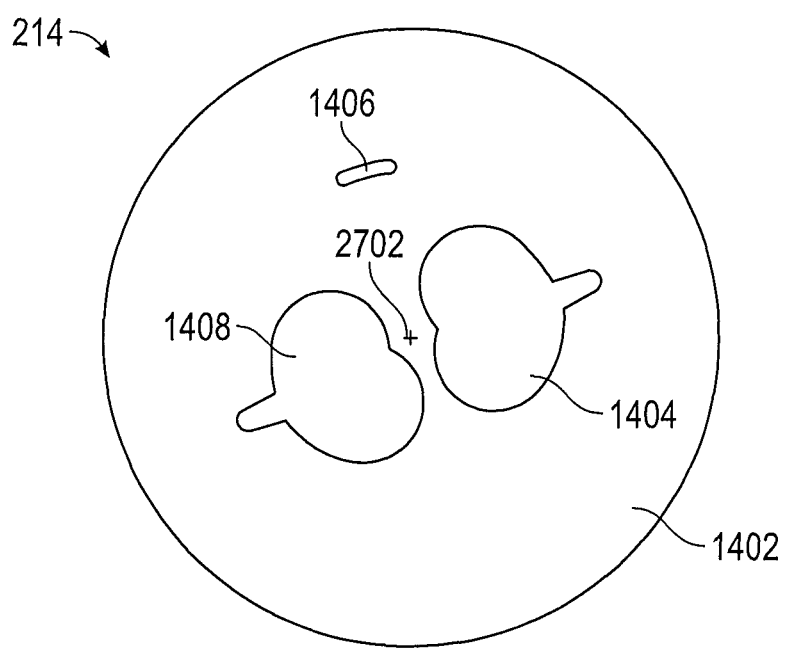
FIG. 14 is an illustration of the face of the rotor of the third alternative embodiment of the present disclosure.

The stator for the third alternative embodiment is illustrated in FIG. 13, while the rotor is illustrated in FIG. 14. The arrangement of the first pump 118 and the second pump 120 remains consistent with the first alternative embodiment. The third alternative embodiment departs from the first and second alternative embodiments by the reducing the number of stator ports and rotor slots, and provides only an internal sample, rather than the potentially larger external sample.

Referring to FIG. 13, the stator 210 of the third alternative embodiment has on its stator face 1302 a first stator orifice 1320 and a second stator orifice 1322 equally positioned about at its centerpoint 2702, together with a first stator port 1306, a second stator port 1318, a third stator port 1304, a fourth stator port 1316, a fifth stator port 1308, a sixth stator port 1310, a seventh stator port 1312, and an eighth stator port 1314. Referring to FIG. 14, the rotor 214 of the second alternative embodiment has on its rotor face 1402 a first rotor slot 1404, a third rotor slot 1006, and a fourth rotor slot 1008, forming channels, in its surface. While the third rotor slot 1006 is an arc of nearly elliptical shape positioned distant the centerpoint 2702, the first rotor slot 1404 and the second rotor slot 1412 are generated with an overlapping three lobe structure such that one of two large lobes of each rotor slot each fully communicates with a first stator orifice 1320 or a second stator orifice 1322 depending on the position of the stator 210 and the rotor 214, while the third lobe provides communication to the other stator orifices 1304, 1306, 1308, 1310, 1312, 1314, 1316, 1318.

Figure 15:
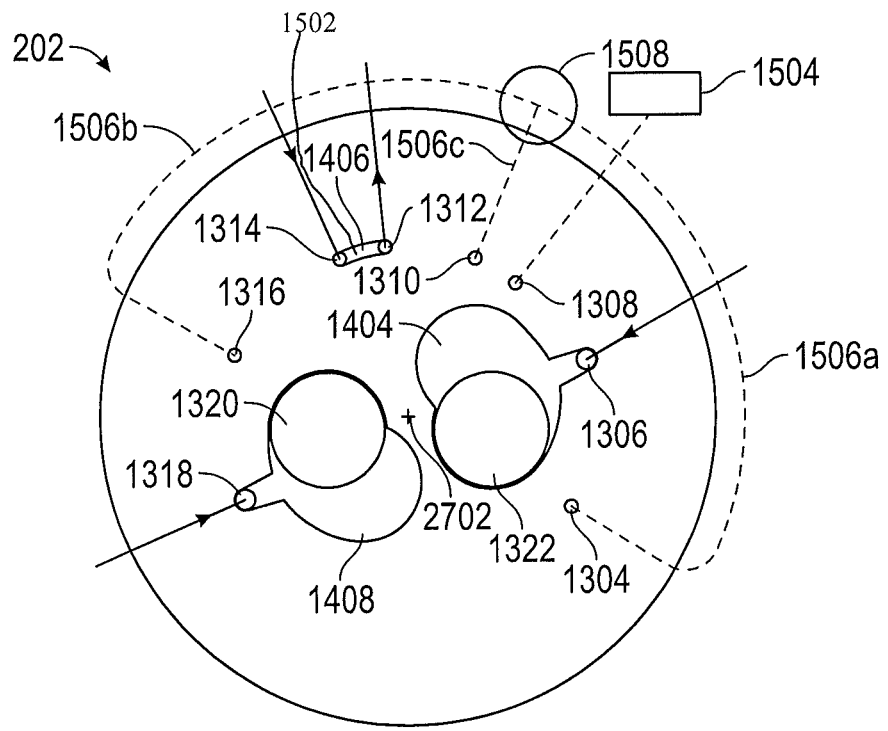
FIG. 15 is an illustration of the relative positions of the face of the stator and the face of the rotor of the third alternative embodiment of the present disclosure in the load position.

In the load position 202 of the third alternative embodiment, depicted in FIG. 15, the stator face 1302 includes a third stator port 1304 in communication via a first external connector 1506a with a three-way connector 1508 and a fourth stator port 1316 in communication via a second external connector 1506b with a three-way connector 1108, which is in communication with the sixth stator port 1310 via a third external connector 1110c. This provides a line on standby. The three-way connector 1508 and/or the third external connector 1506c function as a static mixer to to ensure the two inputs are thoroughly and completely mixed so as to provide a homogeneous solution as previously described in connection with the first alternative embodiment. The stator face 1302 further includes a first stator port 1306 for communication by the first pump 118 with a first mobile phase supply via a first rotor slot 1404, and a second stator port 1318 for communication by the second pump 120 with a second mobile phase, or other liquid, supply via the second rotor slot 1408. The stator face 1302 includes a fifth stator port 1308 in communication with an external chromatographic column 1504, also on standby. The eighth stator port 1314 is adapted for communication with, and during operation is in communication with, the external sample flow and in communication with the seventh stator port 1312 via the third rotor slot 1406. A sample groove 1502 is thus created between eighth stator port 1314 and the seventh stator port 1312. In this load position 202, both the first pump 118 and the second pump 120 are loading, and thus suctioning fluid from the second stator orifice 1322 and the first stator orifice 1320, respectively, where the first stator orifice 1320 is in communication with the second stator port 1318 via the second rotor slot 1408 and the second stator orifice 1322 is in communication with the first stator port 1306 via the first rotor slot 1404.

Figure 16:
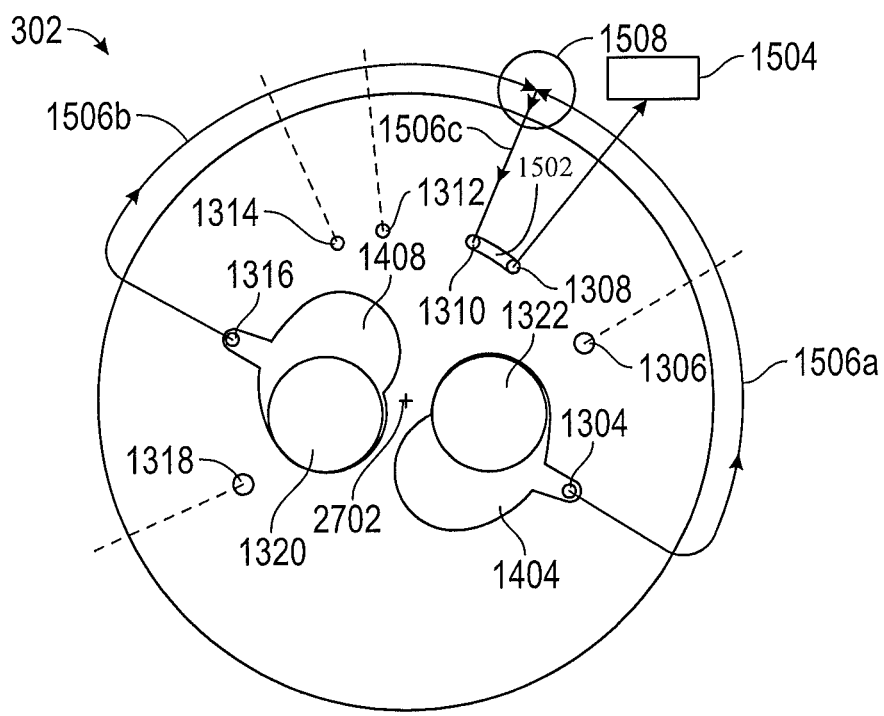
FIG. 16 is an illustration of the relative positions of the face of the stator and the face of the rotor of the third alternative embodiment of the present disclosure in the injection position.

Referring to FIG. 16, in the injection position 302 of the third alternative embodiment, the rotor 214 is rotated in the valve 124 by the drive shaft 216, which may be at or about 45 degrees, so that the existing stator ports and the existing rotor slots to create a second set of flow paths. The second stator orifice 1322 is in communication with the third stator port 1304 via the first rotor slot 144, providing outflow, i.e. dispensing, from the first pump 118. The first stator orifice 1320 is in communication with the fourth stator port 1316 via the second rotor slot 1408, providing outflow, i.e. dispensing, from the second pump 120. The third stator port 1304 and the fourth stator port 1316 thus provide outflow, i.e. dispensing, from the first pump 118 and the second pump 120 and are operably in communication with the three-way connector 1508, prior to communication with the sixth stator port 1310. The first stator port 1306 and the second stator port 1318, each in communication with the carrier supply, are each now isolated. Because the sample contained in the sample groove 1502 is rotated to be in communication with the sixth stator port 1310, into which the outflow, i.e. dispensing, from the first pump 118 and the second pump 120 is provided, and the fifth stator port 1308 is adapted for communication with, and during operation is in communication with, the input to the chromatographic column 1504, the sample contained in the sample groove 1502 is provided to the column 1504 while the valve 124 is in the injection position 302. While in the injection position, the first stator port 1306, the seventh stator port 1312, the eighth stator port 1314, and the second stator port 1318 are isolated from other stator ports.

Fourth Alternative Embodiment

Referring to FIGS. 17, 18, 19 and 20, in a third alternative embodiment, the integral nano-scale pump and injection valve system 100 may be used to provide a gradient system, providing a sample in an internal sample groove 1902 to a chromatographic column 1904 and then to a chromatographic detector 1906.

Figure 17:
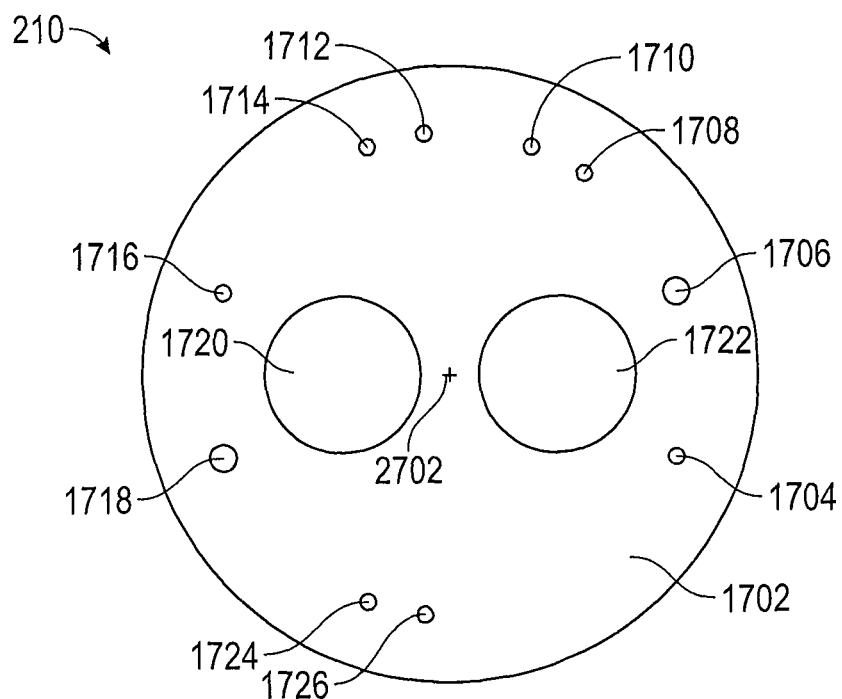
FIG. 17 is an illustration of the face of the stator of the fourth alternative embodiment of the present disclosure.
Figure 18:
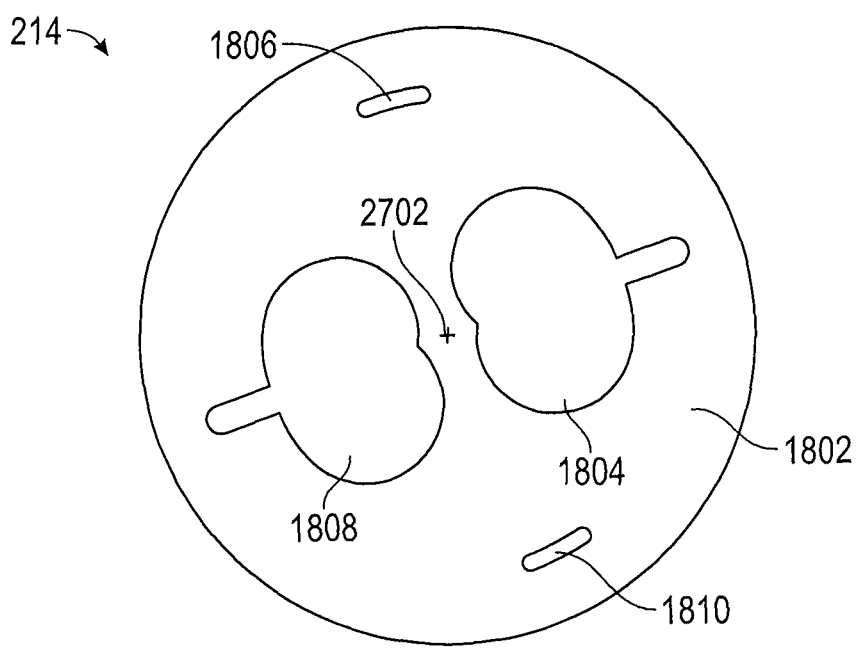
FIG. 18 is an illustration of the face of the rotor of the fourth alternative embodiment of the present disclosure.

The stator 210 for the fourth alternative embodiment is illustrated in FIG. 17, while the rotor 1810 is illustrated in FIG. 18. The arrangement of the first pump 118 and the second pump 120 remains consistent with the third alternative embodiment. The fourth alternative embodiment departs from the third alternative embodiment by the use of a ninth stator port 1724, a tenth stator port 1726, which in connection with a fourth rotor slot 1810 in the rotor face 802 permits a return from the column 1904 to be controlled and directed to a chromatographic detector 1906.

Figure 19:
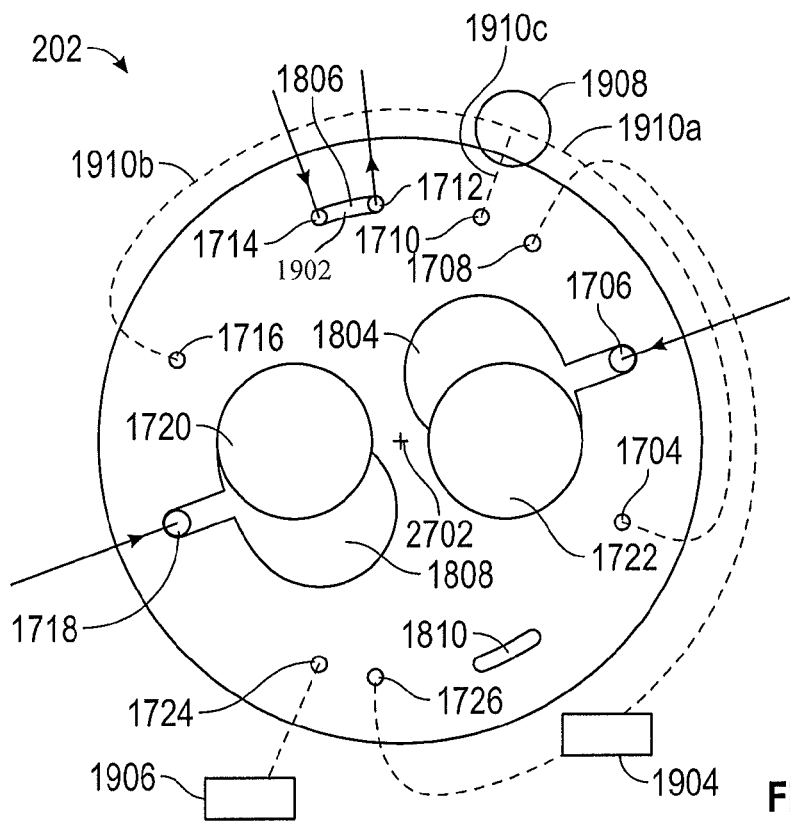
FIG. 19 is an illustration of the relative positions of the face of the stator and the face of the rotor of the fourth alternative embodiment of the present disclosure in the load position.

In the load position 202 of the fourth alternative embodiment, depicted in FIG. 19, the stator face 1702 includes a third stator port 1704 in communication via a first external connector 1910*a* with a three-way connector 1908 and a fourth stator port 1716 in communication via a second external connector 1910*b* with a three-way connector 1908 which in communication with the sixth stator port 1710 via a third external connector 1910*c*. This provides a line on standby. The three-way connector 1908 and/or the third external connector 1910*c* function as a static mixer to to ensure the two inputs are thoroughly and completely mixed so as to provide a homogeneous solution as previously described in connection with the first alternative embodiment. The stator face 1702 further includes a first stator port 1706 for communication by the first pump 118 with a first mobile phase, or other liquid, supply via a first rotor slot 1804, and a second stator port 1718 for communication by the second pump 120 with a second mobile phase, or other liquid, supply via the second rotor slot 1808. The stator face 1702 includes a fifth stator port 1708 which is adapted for communication with, and during operation is in communication with, the input to an external chromatographic column 1904, also on standby. The tenth stator port 1726 is adapted for communication with, and during operation is in communication with, the output of the chromatographic column 1904. The ninth stator port 1724 is adapted for communication with, and during operation is in communication with, the input of the chromatographic detector 1906. The eighth stator port 1714 is adapted for communication with, and during operation is in communication with, the external sample flow and in communication with the seventh stator port 1712 via the third rotor slot 1806. A sample groove 1902 is thus created between eighth stator port 1714 and the seventh stator port 1712. In this load position 202, both the first pump 118 and the second pump 120 are loading, and thus suctioning fluid from the second stator orifice 1722 and the first stator orifice 1720, respectively, where the first stator orifice 1720 is in communication with the second stator port 1718 via the second rotor slot 1808 and the second stator orifice 1722 is in communication with the first stator port 1706 via the first rotor slot 1804.

Figure 20:
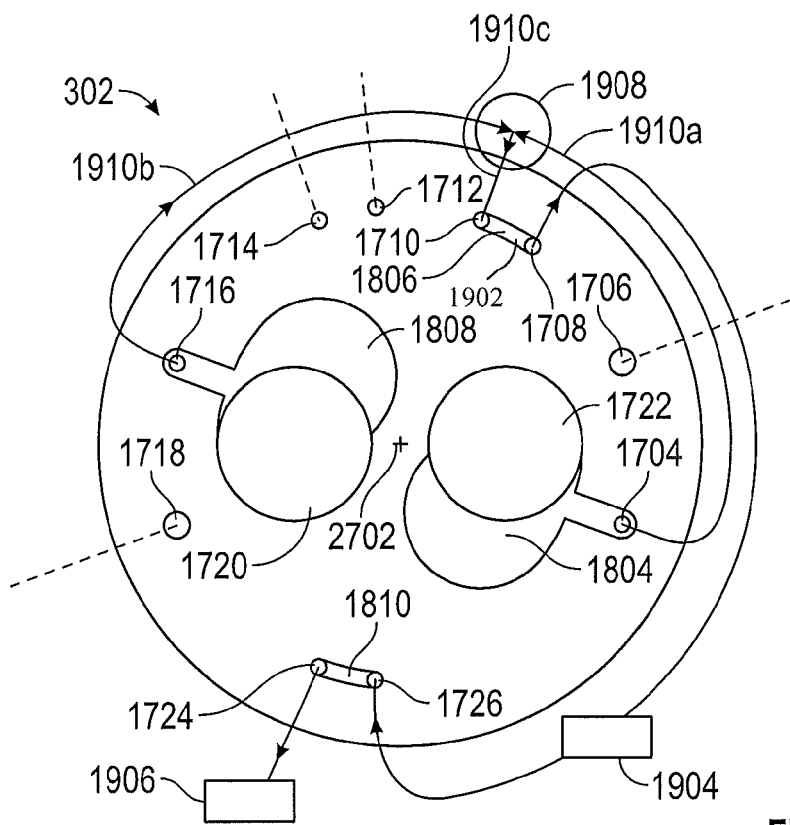
FIG. 20 is an illustration of the relative positions of the face of the stator and the face of the rotor of the fourth alternative embodiment of the present disclosure in the injection position.

Referring to FIG. 20, in the injection position 302 of the fourth alternative embodiment, the rotor 214 is rotated in the valve 124 by the drive shaft 216, which may be at or about 45 degrees, so that the existing stator ports and the existing rotor slots to create a second set of flow paths. The second stator orifice 1722 is in communication with the third stator port 1704 via the first rotor slot 144, providing outflow, i.e. dispensing, from the first pump 118. The first stator orifice 1720 is in communication with the fourth stator port 1716 via the second rotor slot 1808, providing outflow, i.e. dispensing, from the second pump 120. The third stator port 1704 and the fourth stator port 1716 thus provide outflow, i.e. dispensing from the first pump 118 and the second pump 120 and are operably in communication, with the three-way connector 1908, prior to communication with the sixth stator port 1710. Each of the first stator port 1706 and the second stator port 1718, adapted for communication with, and during operation in communication with, the carrier supply, are now isolated. Because the sample contained in the sample groove 1902 is rotated to be in communication with the sixth stator port 1710, into which the outflow, i.e. dispensing from the first pump 118 and the second pump 120 is provided, and the fifth stator port 1708 is adapted for communication with, and during operation is in communication with, the input to the chromatographic column 1904, the sample contained in the sample groove 1902 is provided to the column 1904 while the valve 124 is in the injection position 302. The output from the chromatographic column, from which the separated sample is provided, is in communication with the tenth stator port 1726, which communicates with the ninth stator port 1724 via the fourth rotor slot 1810. As the ninth stator port 1724 is adapted for communication with, and during operation is in communication with, the input to a chromatographic detector 1906, the separated sample is provided to the chromatographic detector 1906. While in the injection position, the first stator port 1706, the seventh stator port 1712, the eighth stator port 1714, and the second stator port 1718 are isolated from other stator ports.

Fifth Alternative Embodiment

Referring to FIGS. 21-26, the integral nano-scale pump and injection valve system 100 may be used to provide a pump without regard to the equipment connected thereto, which provided continuous flow, without the intermittent pressure and flow interruption caused by a binary switch between two pumps. Operation is accomplished by two pumps which may both provide dispersal at the same time, at the same or different flow rates, thus avoiding the even momentary interruption of pressure and flow rate present in convention switching systems by the use of aggregate flow rates from the combination of the two pumps, as controlled by an external controller.

Figure 21:
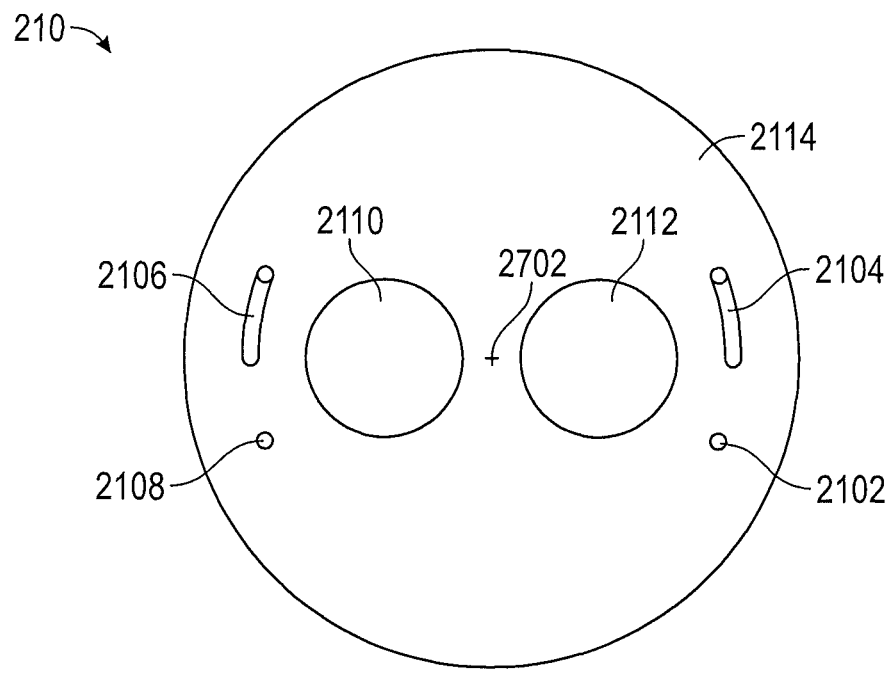
FIG. 21 is an illustration of the face of the stator of the fifth alternative embodiment of the present disclosure.
Figure 22:
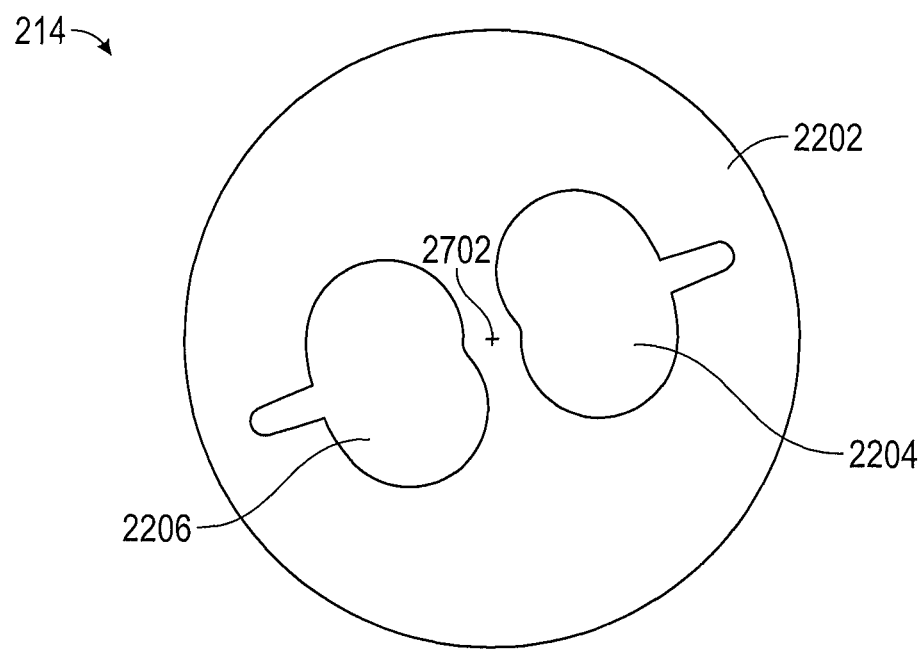
FIG. 22 is an illustration of the face of the rotor of the fifth alternative embodiment of the present disclosure.

The stator 210 for the fifth alternative embodiment is illustrated in FIG. 21, while the rotor 214 is illustrated in FIG. 22. The arrangement of the first pump 118 and the second pump 120 remains consistent with the third alternative embodiment. The fifth alternative embodiment departs from the prior embodiments by providing a pump for continuous operation, which may be used in connection with other chromatographic equipment. Continuous operation is made possible by incorporating alternating operation of the first pump 118 and the second pump 120, rather the concurrent operation of the prior embodiments, and by utilizing a first position, a second position, and a third position, rather than load and injection positions.

Referring to FIG. 21, the stator 210 of the fifth alternative embodiment has on its stator face 2114, a first stator orifice 2110 and a second stator orifice 2112, equally positioned about at its centerpoint 2702, together with a first stator port 2102, a second stator port 2108, a third stator port-and-slot 2104, and a fourth stator port-and-slot 2106. Referring to FIG. 22, the rotor 214 of the fifth alternative embodiment has on its rotor face 2202 a first rotor slot 2204, and a second rotor slot 2206, forming channels, in its surface. The first rotor slot 2204 and the second rotor slot 2206 are generated with an overlapping three lobe structure such that one of two large lobes of each rotor slot each fully communicates with a first stator orifice 2110 or a second stator orifice 2112 depending on the position of the stator 210 and the rotor 214, while the third lobe provides communication to the other stator ports 2102, 2108 and ports-and-slots 2104, 2106.

Figure 23:
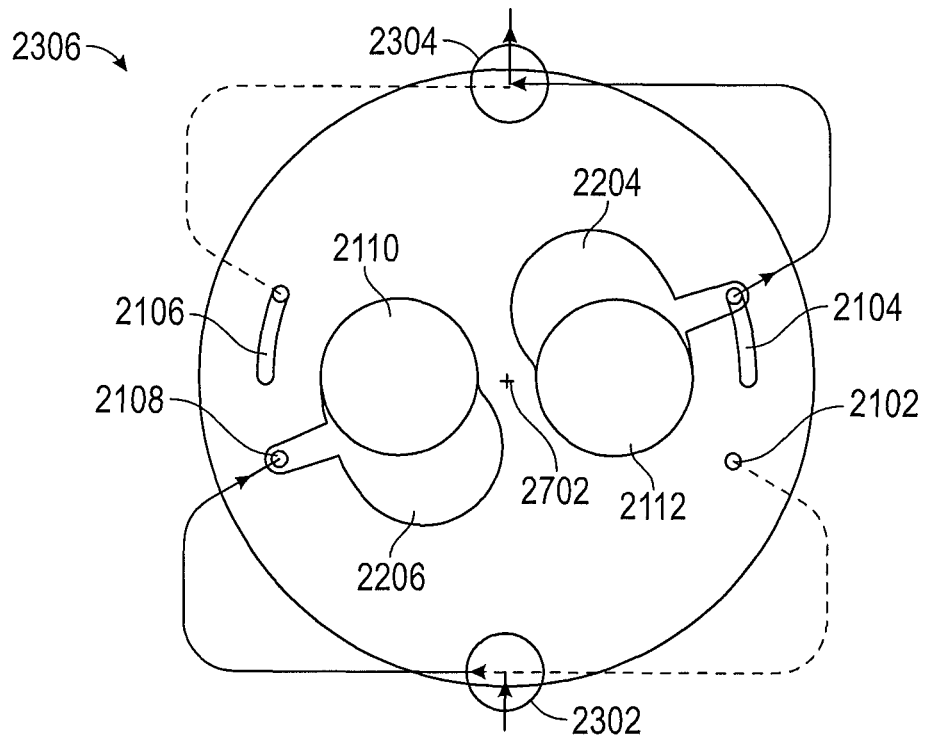
FIG. 23 is an illustration of the relative positions of the face of the stator and the face of the rotor of the fifth alternative embodiment of the present disclosure in the first position.

In the first position 2306, illustrated in FIG. 23, the first pump 118 is in injection mode, dispensing the carrier, while the second pump 120 is in load mode, suctioning the carrier. The first pump 118 is in communication with the second stator orifice 2112, which is communication with the third stator port-and-slot 2104 via the first rotor slot 2204. The third stator port-and-slot 2104 is adapted for communication with, and during operation is in communication with, a three-way connector output 2304, which may also be a static mixer, and provides an output thereto by dispensing. The second pump 120 is in communication with the first stator orifice 2110, which is in communication with the second stator port 2108 via the second rotor slot 2206. The third stator port 2108 is adapted for communication with, and during operation is in communication with, a common supply via a three-way connector 2302, and obtains the supply thereto to be drawn in to the second pump 120 under suction.

Figure 24:
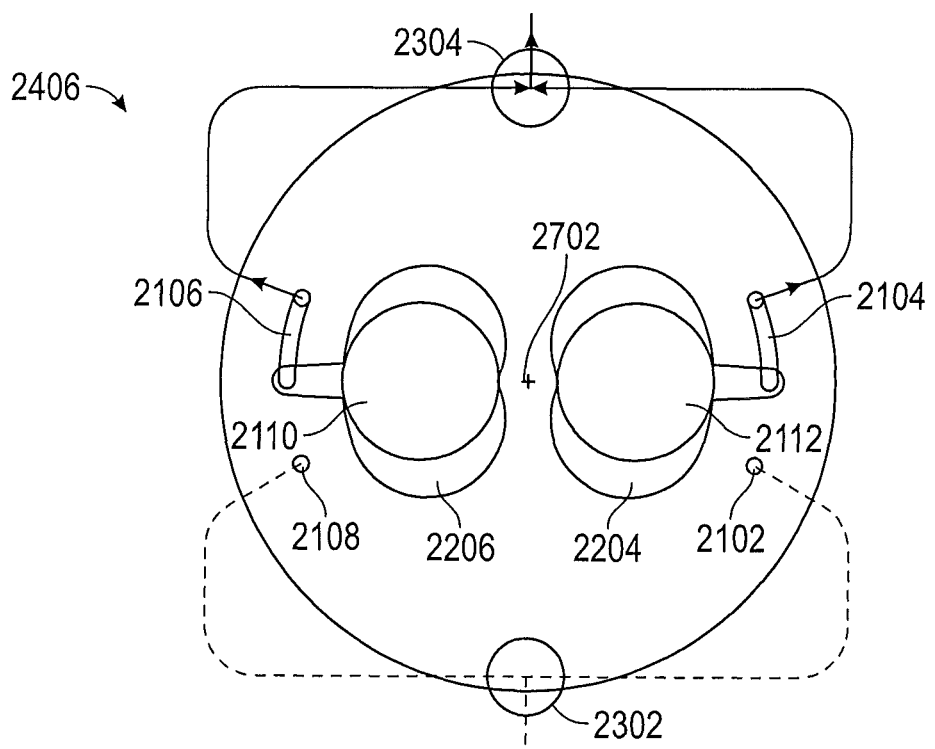
FIG. 24 is an illustration of the relative positions of the face of the stator and the face of the rotor of the fifth alternative embodiment of the present disclosure in the second position.

In the second position 2406, illustrated in FIG. 24, which follows the first position 2306, the first pump. 118 is still in injection mode, dispensing the carrier, while the second pump 120 also now in injection mode, albeit behind the first pump 118 in time. The first pump 118 is in communication with the second stator orifice 2112, which is communication with the third stator port-and-slot 2104 via the first rotor slot 2204. The third stator port-and-slot 2104 is adapted for communication with, and during operation is in communication with, a three-way connector output 2304, which may also be a static mixer, and provides an output thereto by dispensing. The second pump 120 is in communication with the first stator orifice 2110, which is in communication with the fourth stator port-and-slot 2106 via the second rotor slot 2206. The fourth stator port-and-slot 2106 is adapted for communication with, and during operation is in communication with, the three-way connector output 2304 and provides an output thereto by dispensing.

Figure 25:
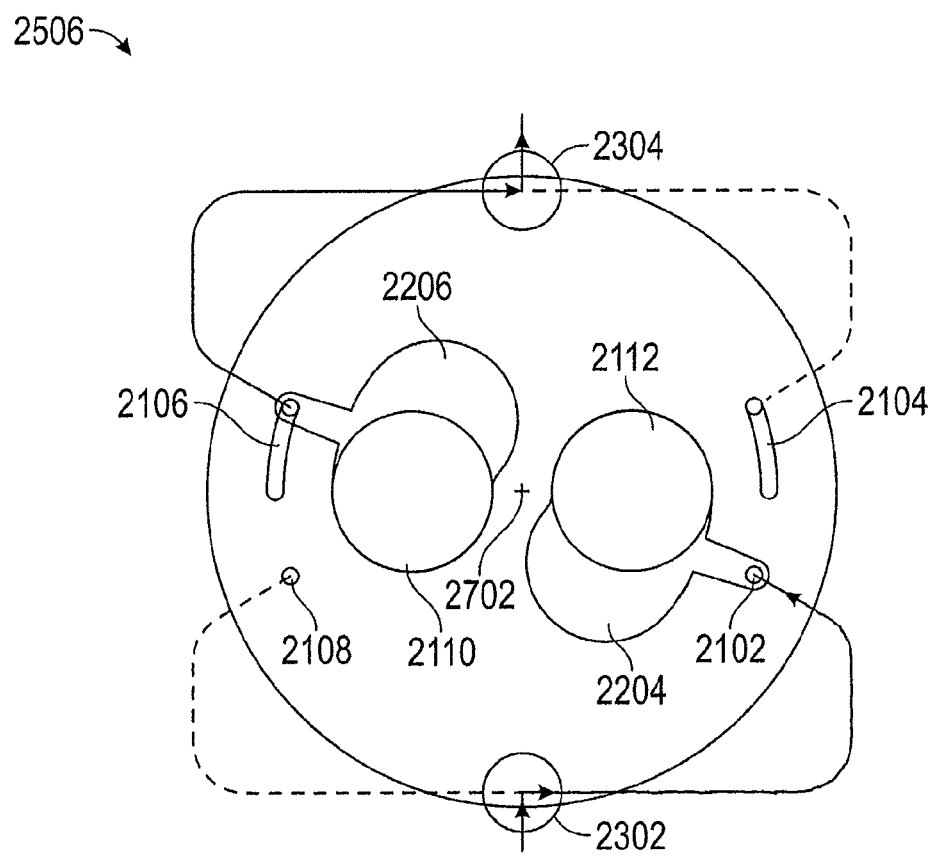
FIG. 25 is an illustration of the relative positions of the face of the stator and the face of the rotor of the fifth alternative embodiment of the present disclosure in the third position.

In the third position 2506, illustrated in FIG. 25, the first pump 118 is in load mode, while the second pump 120 is in injection mode dispensing the carrier. The first pump 118 is in communication with the second stator orifice 2112, which is communication with the third stator port-and-slot 2102 via the first rotor slot 2204. The first stator port-and-slot 2102 is adapted for communication with, and during operation is in communication with, a common supply via a three-way connector 2302 and obtains the supply thereto to be drawn in to the first pump 118 under suction. The second pump 120 is in communication with the first stator orifice 2110, which is in communication with the fourth stator port-and-slot 2106 via the second rotor slot 2206. The fourth stator port-and-slot 2106 is adapted for communication with, and during operation is in communication with, a three-way connector output 2304, which may also be a static mixer. The simultaneous injection by the second pump 120 and the loading by the first pump 118 are illustrated in FIG. 27, an illustration of a close-up about the ends of each of the plungers in their respective barrels in the third position.

Figure 26:
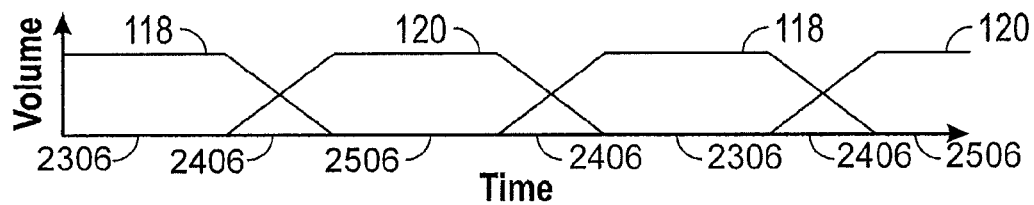
FIG. 26 is an illustration of the volume per unit time during operation dispensed by each of the two pumps of the present disclosure and the associated position, of the three positions, for the fifth alternative embodiment.

As illustrated in FIG. 26, as the first pump 118 and the second pump 120 are set to cycle so that one is always in injection mode, the volume per unit time injected from the integral nano-scale pump and injection valve system 100 is constant, such that as the volume injected from of one pump reduces over time, the volume injected from the other pump likewise increases, providing a constant volume per unit time. This is accomplished by sequencing through the adjacent position during operation until the desired volume has been dispersed, i.e. first position 2306, second position 2406, third position 2506, second position 2406, first position 2306, second position 2406, third position 2506, etc.

Thus, the present invention provides an integral nano-scale pump and injection valve system 100 for high performance liquid chromatography which includes an integrated barrel-stator 110, which has an elongate barrel 116 in an integrated barrel-stator first section 220 and a stator 210 at an integrated barrel-stator second section 222, a plunger 206 slidably disposed within an interior chamber 208 of the barrel 116 of substantially uniform cross-section, and a rotor 214, wherein the first pump 118 and second pump 120 and valve 124 are switchable between a load position 202 and an injection position 302. The circular rotor 214 has a surface adjacent the stator 210 and has a plurality of channels or slots in its surface and is rotatable with respect to the stator 210 about a centerpoint between the load position 202 and the injection position 302. The elongate barrel 116 portion of the integrated barrel-stator 110 includes an open proximal end, an open distal end, a length, and a sidewall defining the interior chamber 208 adapted to receive a supply of fluid and which has an inner diameter, an outer diameter, and a wall thickness. The circular stator 210 has two orifices positioned about its centerpoint and a first side and a second side such that the elongate barrel open distal end is aligned with the second side of the stator 210 at the centerpoint and the interior chamber 208 includes the orifice 320. The first pump 118 is therefore in communication with the valve 124 at the orifice 320.

The nano-scale operation of the integrated nano-scale pump and injection valve system 100 is made possible by integration of parts may be further augmented by sufficient and operable 360 zero-dead volume micrometer fittings, and by material selection. Diamond-coated surfaces may be utilized where beneficial. The plunger 206 may be constructed of a work hardened super alloy, such as MP35N, a nickel-chromium-molybdenum-cobalt alloy providing ultra-high strength, toughness, ductility and high corrosion resistance—particularly from contact with hydrogen sulfide, chlorine solutions and mineral acids (nitric, hydrochloric, and sulfuric). Moreover, the nano-scale operation of the integrated nano-scale pump and injection valve system 100 permits portability, such as being battery-operated, while being light weight, having low mobile phase, or other liquid, consumption and generating low waste. Additionally, this system, designed particularly for capillary column use, does not employ a splitter, provides a substantial in operation. The integrated nano-scale pump and injection valve system 100 can generate up to 110.32 MPa (16,000 psi) pressure, with a pump volume capacity of 24 μL, and a sample volume as low as 10 nL, or higher, such as 60 nL, can be injected. As a result of the structures provided herein, the maximum and minimum dispensing volumetric flow rates of the integrated nano-scale pump and injection valve system 100 are 74.2 μL/min and 60 nL/min, respectively. This may further be accomplished by providing the sample loop 702, 1102 of tubing to carry the mobile phase, or other liquid, to the column during injection (dispensing). The sample loop may have a small inner diameter, such as 75 or 150 μm, may be of materials selected by the operator, such as stainless steel or fused silica. and may be of a length sized to each pump 118, 120, such as a length of 5.08 cm.

The terms and expressions which have been employed in the foregoing specification are used therein as terms of description and not of limitation, and there is no intention, in the use of such terms and expressions, of excluding equivalents of the features shown and described or portions thereof.

We claim:

1. An integral nano-scale pump and injection valve system (100) for high performance liquid chromatography comprising:
an integrated barrel-stator (110), said integrated barrel-stator (110) having a first elongate barrel (116), a second elongate barrel (116B), and a stator (210) integrally formed of a single piece of monolithic material, said integrated barrel-stator (110) having an integrated barrel-stator first section (220) and an integrated stator barrel second section (222),
said stator (210) having a stator first side (240),
said first elongate barrel (116) having a first elongate barrel first open end (430) in said integrated barrel-stator first section (220) and a second open end (2704) at said integrated stator barrel-stator second section (222), and a sidewall (2708) defining a first interior chamber (208) adapted to receive a supply of fluid at second open end (2704),
said first elongate barrel second open end (2704) at said stator first side (240) and providing a second stator orifice (2814),
said second elongate barrel (116B) having a second elongate barrel first open end (430B) in said integrated stator barrel first section (220) and a second elongate barrel second open end (2704) at said integrated barrel-stator second section (222), and a second elongate barrel sidewall (2708B) defining an second interior chamber (208B) adapted to receive a supply of fluid at first open end (2704B),
said second elongate barrel second open end (2704B) at said stator first side (240) and providing a first stator orifice (2812),
said stator (210) having a first stator fluid supply port (2806) for communication with a liquid supply and having a second stator fluid supply port (2810) for communication with a liquid supply,
said stator (210) having a third stator port (2804) and having a fourth stator port (2808),
said stator (210) in contact at a surface of a stator lace (2802) with a surface of a rotor face (602) of a rotor (214), said stator (210) adapted to communicate with said rotor (214) at said first stator fluid supply port (2806) and adapted to communicate with said rotor (214) at said second stator fluid supply port (2810), said first stator orifice (2812) and said second stator orifice (2814) being non-overlapping;
a first longitudinal plunger (206) slidably disposed within said first interior chamber (208), said first longitudinal plunger (206) being of substantially uniform cross section, a second longitudinal plunger (206B) slidably disposed within said second interior chamber (208B), said second longitudinal plunger (206B) being of substantially uniform cross section,
said rotor (214) having a first channel (604) in said rotor face (602) and a second channel (612) in said rotor face (602),
said rotor (214) rotable with respect to said stator (210) about a centerpoint of said stator (210) between a load position (202) and an injection position (302),
said load position (202) defined by said second stator orifice (2814) in communication with said first stator fluid supply port (2806) via said first channel (2904) and said first stator orifice (2812) in communication with said second stator fluid supply port (2810) via said second channel (2906), and
said injection (302) position defined by said second stator orifice (2814) in communication with said third stator port (2804) via said first channel (2904) and said first stator orifice (2812) in communication with said fourth stator port (2808) via said second channel (2906).

2. The integral nano-scale pump and injection valve system of claim 1 further comprising:
a first hard plastic seal (406) about said first longitudinal plunger (206) sized to it within said first elongate barrel (116) and to fit about said first longitudinal plunger (206) without contacting said first longitudinal plunger (206);
a flexible seal (408) about said first longitudinal plunger (206) sized to fit within said first elongate barrel (116) and to fit about said first longitudinal plunger (206) adjacent said first hard plastic seal (406);
a second hard plastic seal (410) about said first longitudinal plunger (206) sized to fit within said first elongate barrel (116) and to fit about said first longitudinal plunger (206) without contacting said first longitudinal plunger (206) and adjacent said flexible seal (408);
a driving disk (412) having a bore therethrough sized to fit about said first longitudinal plunger (206) without interference, said driving disk (412) having a driving disk first end (428) and a driving disk second end (426), said driving disk (412) sized to freely fit within said integrated barrel-stator (110) adjacent first elongate barrel (116), said driving disk having a shoulder (422) near said driving disk first end (428), and a neck (424) at said driving disk second end (426), said neck (424) sized to fit within first elongate barrel (116) and to contact said first hard plastic seal (406);
a sleeve with external threads (416) having a bore therethrough sized to permit movement of said first longitudinal plunger (206) without interference, said sleeve with external threads (416) sized to a sleeve with internal threads (432) within said integrated barrel-stator (110) adjacent said first elongate barrel (116); and
a spring (418) contacting said shoulder (422) of said driving disk (412) and an end of said sleeve with external threads (416).

3. The integral nano-scale pump and injection valve system of claim 2, further comprising a first pump actuator (108) associated with a plunger-driving piston (212) attached to said first longitudinal plunger (206).

4. The integral nano-scale pump and injection valve system of claim 3, further comprising a valve actuator associated with a driveshaft (216) attached to said rotor (214).

5. The integral nano-scale pump and injection valve of claim 2 further comprising:
said stator (210) having a fifth stator port (508), a sixth stator port (510), a seventh stator port (512), an eighth stator port (514), a ninth stator port (516) and a tenth stator port (518);
said rotor (214) having a third rotor slot (606) in said rotor face (602), a fourth rotor slot (608) in said rotor face (602) and a fifth rotor slot (610) in said rotor face (602); and
wherein said load position further comprises
said third stator port (504) adapted for communication via a first external connector (706a) with a three-way connector (708), said fourth stator port (520) adapted for communication via a second external connector (706b) with said three-way connector (708); and said fifth stator port (508) adapted for communication via a third external connector (706c) with said three-way connector (708);

said sixth stator port (510) in communication with said seventh stator port (512) via said third rotor slot (606), said seventh stator port (512) adapted for communication with a sample loop return;

said eighth stator port (514) adapted for communication with a fluid sample source and in communication with said ninth stator port (516) via said fourth rotor slot (608);

said ninth stator port (516) adapted for communication with said sixth stator port (510) via an external sample loop (702);

said tenth stator port (518) adapted for communication with an input to a chromatographic device (704) and in communication with said fifth rotor slot (610);

and wherein said injection position further comprises:

said third stator port (504) in communication via said first external connector (706a) with said three-way connector (708), said fourth stator port (520) in communication via said second external connector (706b) with said three-way connector (708); and said fifth stator port (508) in communication via said third external connector (706c) with said three-way connector (708)

said fifth stator port (508) in communication with said sixth stator port (510) via said third rotor slot (606);

said sixth stator port (510) in communication with said ninth stator port (516) via said external sample loop (702);

said ninth stator port (516) in communication with said tenth stator port (518) via said fifth rotor slot (610);

said eighth stator port (514) adapted for communication with said fluid sample source and in communication with said seventh stator port (512) via said fourth rotor slot (608);

said seventh stator port (512) adapted for communication with a sample loop return; and said tenth stator port (518) adapted for communication with said input to said chromatographic device (704).

6. The integral nano-scale pump and injection valve of claim 5, wherein said third external connector is a static mixer.

7. The integral nano-scale pump and injection valve system of claim 5, further comprising a first pump actuator (108) associated with a plunger-driving piston (212) attached to said first longitudinal plunger (206).

8. The integral nano-scale pump and injection valve system of claim 7, further comprising a valve actuator associated with a driveshaft (216) attached to said rotor (214).

9. The integral nano-scale pump and injection valve system of claim 5, further comprising said chromatographic device (1104) being a chromatographic column (1104);

said stator (210) having an eleventh stator port (928), a twelfth stator port (930), and a thirteen stator port (932); and said rotor (214) having a sixth rotor slot (1014);

wherein said load position (202) further comprises said eleventh stator port (928) being adapted to communicate to an input of a chromatographic detector (1106);

said twelfth stator port (930) being adapted to receive an output of said chromatographic column (1104);

said twelfth stator port (930) in communication with thirteenth stator port (932) via said sixth rotor slot (1014);

and wherein said injection position (302) further comprises said twelfth stator port (930) being adapted to receive an output of said chromatographic column (1104);

said twelfth stator port (930) in communication with said eleventh stator port (928) via said sixth rotor slot (1014); and said eleventh stator port (928) being adapted to communicate to an input of a chromatographic detector (1106).

10. The integral nano-scale pump and injection valve system of claim 9, further comprising a first pump actuator (108) associated with a plunger-driving piston (2) attached to said first longitudinal plunger (206).

11. The integral nano-scale pump and injection valve system of claim 10, further comprising a valve actuator associated with a driveshaft (216) attached to said rotor (214).

12. The integral nano-scale pump and injection valve system of claim 2 further comprising:

said stator (210) having a fifth stator port (1308), a sixth stator port (1310), a seventh stator port (1312), and an eighth stator port (1314);

said rotor (214) having a third rotor slot (606) in said rotor face (602), and wherein said load position further comprises:

said third stator port (1304) adapted for communication via a first external connector (1506a) with a three-way connector (1508), said fourth stator port (1316) adapted for communication via a second external connector (1506b) with said three-way connector (1508), said sixth stator port (1310) adapted for communication via a third external connector (706c) with said three-way connector (1508);

said fifth stator port (1308) adapted for communication with an input to a chromatographic device (704);

said eighth stator port (1314) adapted for communication with a fluid sample source and in communication with said seventh stator port (1312) via said third rotor slot (1406);

and wherein said injection position further comprises:

said third stator port (1304) in communication via said first external connector (1506) with said three-way connector (1508), said fourth stator port (1316) in communication via said second external connector (1506b) with said three-way connector (1508), said sixth stator port (1310) in communication via said third external connector (706c) with said three-way connector (1508);

said sixth stator port (1310) in communication with said fifth stator port (1308) via said third rotor slot (1406);

said fifth stator port (1308) adapted for communication with said input to said chromatographic device (704); and wherein said third rotor slot (1406) is adapted to contain said sample for processing.

13. The integral nano-scale pump and injection valve system of claim 12, further comprising a first pump actuator (108) associated with a plunger-driving piston (212) attached to said first longitudinal plunger (206).

14. The integral nano-scale pump and injection valve system of claim 13, further comprising a valve actuator associated with a driveshaft (216) attached to said rotor (214).

15. The integral nano-scale pump and injection valve system of claim 12 further comprising:
said chromatographic device (1904) being a chromatographic column (1904);
said stator (210) having a ninth stator port (1724) and a tenth stator port (1726);
said rotor (214) having a fourth rotor slot (1810) in said rotor face (602); and
wherein said load position (202) further comprises:
said tenth stator port (1726) being adapted to receive an output of said chromatographic column (1904);
said ninth stator port (1724) being adapted to communicate to an input of a chromatographic detector (1906);
wherein said injection position (302) further comprises:
said tenth stator port (1726) being adapted to receive an output of said chromatographic column (1904);
said tenth stator port (1726) in communication with said ninth stator port (1724) via said fourth rotor slot (1810); and
said ninth stator port (1724) being adapted to communicate to an input of a chromatographic detector (1106).

16. The integral nano-scale pump and injection valve system of claim 15, further comprising a first pump actuator (108) associated with a plunger-driving piston (212) attached to said first longitudinal plunger (206).

17. The integral nano-scale pump and injection valve system of claim 16, further comprising a valve actuator associated with a driveshaft (216) attached to said rotor (214).

18. The integral nano-scale pump and injection valve of claim 12, wherein said third external connector is a static mixer.

19. An integral nano-scale pump and injection valve system (100) for high performance liquid chromatography comprising:
an integrated barrel-stator (110), said integrated barrel-stator (110) having a first elongate barrel (116), a second elongate barrel (116B), and a stator (216) integrally formed of a single piece of monolithic material, said integrated barrel stator (110) having an integrated barrel-stator first section (220) and an integrated stator barrel second section (222),
said stator (210) having a stator first side (240),
said first elongate barrel (116) having a first elongate barrel first open end (430) in said integrated stator barrel first section (220) and a second open end (2704) at said integrated barrel-stator second section (222), and a sidewall (2708) defining a first interior chamber (208) adapted to receive a supply of fluid at second open end (2704),
said first elongate barrel second open end (2704) at said stator first side (240) and providing a second stator orifice (2112),
said second elongate barrel (116B) having a second elongate barrel first open end (430B) in said integrated stator barrel first section (220) and a second elongate barrel second open end (2704) at said integrated barrel-stator second section (222), and a second elongate barrel sidewall (2708B) defining an second interior chamber (208B) adapted to receive a supply of fluid at first open end (2704B),
said second elongate barrel second open end (2704B) at said stator first side (240) and providing a first stator orifice (2110);
said stator (210) having a first stator fluid supply port (2102) for communication with a liquid supply and having a second stator fluid supply port (2108) for communication with a liquid supply,
said stator (210) having a third stator port (2104) and having a fourth stator port (2106),
said stator (210) in contact at a surface of a stator face (502) with a surface of a rotor face (602) of a rotor (214), said stator (210) adapted to communicate with said rotor (214) at said first stator fluid supply port (2102) and adapted to communicate with said rotor (214) at said second stator fluid supply port (2108), said first stator orifice (2110) and said second stator orifice (2112) being non overlapping;
a first longitudinal plunger (206) slidably disposed within said first interior chamber (208), said first longitudinal plunger (206) being of substantially uniform cross section;
a second longitudinal plunger (206B) slidably disposed within said second interior chamber (208B), said second longitudinal plunger (206B) being of substantially uniform cross section;
said rotor (214) having a first channel (604) in said rotor face (602) and a second channel (612) in said rotor face (602);
said rotor (214) rotable with respect to said stator (210) about a centerpoint of said stator (210) among a first position (2306) in which said first pump (118) is dispensing while said second pump (120) is loading, a second position (2406) in which said first pump (118) is dispensing and said second pump (120) is dispensing and a third position (2506) in which said first pump (118) is loading while said second pump (120) is dispensing;
said first position (2306) defined by said second stator orifice (2112) in communication with said third stator port-and-slot (2104) via said first rotor slot (2204), said third stator port-and-slot (2104) adapted for communication with a three-way connector output (2304), said first stator orifice (2110) in communication with said second stator port (2108) via said second rotor slot (2206), and said third stator port (2108) adapted for communication with a supply (2302);
said second position (2406) defined by said second stator orifice (2112) in communication with said third stator port-and-slot (2104) via said first rotor slot (2204), said third stator port-and-slot (2104) adapted for communication with said three-way connector output (2304), said first stator orifice (2110) in communication with said fourth stator port-and-slot (2106) via said second rotor slot (2206), said fourth stator port-and-slot (2106) adapted for communication with said three-way connector output (2304), and
said third position (2506) defined by said second stator orifice (2112) in communication with said third stator port-and-slot (2102) via said first rotor slot (2204), said first stator port-and-slot (2102) adapted for communication with a supply (2302), said first stator orifice (2110) in communication with said fourth stator port-and-slot (2106) via said second rotor slot (2206), said fourth stator port-and-slot (2106) adapted for communication with said three-way connector output (2304).

20. The integral nano-scale pump and injection valve system of claim 19 further comprising:
a first hard plastic seal (406) about said first longitudinal plunger (206) sized to fit within said first elongate barrel (116) and to fit about said first longitudinal plunger (206) without contacting said first longitudinal plunger (206);

a flexible seal (408) about said first longitudinal plunger (206) sized to fit within a first elongate barrel (116) and to fit about said first longitudinal plunger (206) adjacent said first hard plastic seal (406);

a second hard plastic seal (410) about said first longitudinal plunger (206) sized to fit within first elongate barrel (116) and to fit about said first longitudinal plunger (206) without contacting said first longitudinal plunger (206), and adjacent said flexible seal (408);

a driving disk (412) having a bore therethrough sized to fit about said first longitudinal plunger (206) without interference, a driving disk first end (428) and a driving disk second end (426), said driving disk (412) sized to freely fit within said integrated barrel-stator (110) adjacent first elongate barrel (116), said driving disk having a shoulder (422) near said driving disk first end (428), and a neck (424) at said driving disk second end (426), said neck (424) sized to fit within first elongate barrel (116) and to contact said first hard plastic seal (406);

a sleeve with external threads (416) having a bore therethrough sized to permit movement of said first longitudinal plunger (206) without interference, said sleeve with external threads (416) sized to a sleeve with internal threads (432) within said integrated barrel-stator (110) adjacent said first elongate barrel (116); and a spring (418) contacting said shoulder (422) of said driving disk (412) and an end of said sleeve with external threads (416).

21. The integral nano-scale pump and injection valve system of claim 20, further comprising a first pump actuator (108) associated with a plunger-driving piston (212) attached to said first longitudinal plunger (206).

22. The integral nano-scale pump and injection valve system of claim 21, further comprising a valve actuator associated with a driveshaft (216) attached to said rotor (214).

23. The integral nano-scale pump and injection valve of claim 19, wherein said third external connector is a static mixer.

* * * * *